United States Patent
Iwata et al.

(10) Patent No.: US 6,766,714 B2
(45) Date of Patent: Jul. 27, 2004

(54) CASE MEMBER MOUNTING STRUCTURE

(75) Inventors: Kazuyuki Iwata, Wako (JP); Keiko Yoshida, Wako (JP); Atsushi Tanaka, Wako (JP); Yuuji Ishimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,655

(22) Filed: May 30, 2001

(65) Prior Publication Data
US 2001/0049978 A1 Dec. 13, 2001

(30) Foreign Application Priority Data

| Jun. 1, 2000 | (JP) | 2000-163917 |
| Jun. 5, 2000 | (JP) | 2000-167774 |
| Dec. 28, 2000 | (JP) | 2000-402950 |

(51) Int. Cl.[7] ............................................. F16M 1/00
(52) U.S. Cl. ..................................................... 74/606 R
(58) Field of Search ....................................... 74/606 R

(56) References Cited

U.S. PATENT DOCUMENTS

| 4,108,021 | A | * | 8/1978 | MacAfee et al. | ........... 475/203 |
| 4,269,287 | A | | 5/1981 | Rösch | ................ 188/1 B |
| 4,446,755 | A | * | 5/1984 | Takahashi | ........... 192/113.2 |
| 4,977,870 | A | * | 12/1990 | Hashimoto et al. | .......... 524/423 |
| 5,000,142 | A | * | 3/1991 | Aruga et al. | ............ 123/195 C |
| 5,148,784 | A | | 9/1992 | Hiraoka et al. | ............. 123/195 |
| 5,176,040 | A | * | 1/1993 | Kawabe | ................... 277/565 |
| 5,207,121 | A | * | 5/1993 | Bien | ................... 74/606 R |
| 5,501,117 | A | * | 3/1996 | Mensing et al. | .............. 74/420 |
| 5,558,059 | A | * | 9/1996 | Yoshinaga et al. | ...... 123/198 E |
| 5,768,952 | A | * | 6/1998 | Tsukamoto et al. | ......... 475/269 |
| 5,768,954 | A | * | 6/1998 | Grabherr et al. | ........... 184/11.1 |
| 5,832,789 | A | * | 11/1998 | Kinto et al. | ............... 74/421 A |
| 6,050,236 | A | * | 4/2000 | Sawaki et al. | .......... 123/195 C |
| 6,065,439 | A | * | 5/2000 | Achenbach et al. | ..... 123/198 E |

FOREIGN PATENT DOCUMENTS

| DE | 297 05 972 U1 | | 5/1997 |
| DE | 198 11 493 A1 | | 9/1999 |
| JP | 4-91210 | | 8/1992 |
| JP | 7-83069 | | 3/1995 |
| JP | 07-083069 | | 3/1995 |
| JP | 0806111 A | * | 3/1996 |
| JP | 09-090960 | | 4/1997 |
| JP | 410299500 A | * | 11/1998 |

OTHER PUBLICATIONS

Communication dated Oct. 29, 2002 and European Search Report dated Oct. 23, 2002.

\* cited by examiner

*Primary Examiner*—David A. Bucci
*Assistant Examiner*—Julie K. Smith
(74) *Attorney, Agent, or Firm*—Armstrong, Kratz, Quintos, Hanson & Brooks, LLP

(57) ABSTRACT

A case member mounting structure, in which a case member (5) is mounted to an engine body (2, 3, 4) by fixing an outer circumference of the case member (5) to the engine body (2, 3, 4) with a plurality of fastening means (34) to cover a power transmission mechanism, includes at least one projecting portion (40, 41) which projects from one or both of the inner wall surface of the case member (5) and the outer wall surface of the engine body (2, 3, 4) for contact with the other, and a seal member (44) applied to the contact surface at the distal end of the projecting portion (40, 41).

19 Claims, 28 Drawing Sheets

CASE MEMBER MOUNTING STRUCTURE

BACKGROUND OF THE INVENTION

1. Field of the Invention

This invention relates to a mounting structure for rigidly mounting to a device body a case member covering a portion exposed from the device body. More particularly, the invention relates to a mounting structure of a case member for covering a portion exposed from an internal combustion engine where a power transmitting mechanism, for example, is located.

2. Description of the Related Art

A cam chain cases used to cover a valve driving mechanism disposed in a crank shaft end portion of an internal combustion engine has been detachably attached rigidly to the body of an internal combustion engine with bolts at positions along its outer circumferential periphery, as shown in Japanese Patent Laid-Open Publication No. hei 7-83069.

A central portion of the cam chain case disclosed on the same publication is liable to yieldingly deform in a rectangular direction with respect to a case plane portion. In particular, because of a low rigidity of a peripheral portion of a through hole at the central portion of the cam chain case at an end surface of the engine, through which a shaft of a water pump passes, the central portion of the cam chain case is liable to vibrate.

For the purpose of preventing it, the cam chain case has a plurality of bolt boss portions surrounding the through hole such that bolts in threading engagement with the engine body through the bolt boss portions rigidly couple the cam chain case central portion to the engine body to prevent or alleviate vibrations of the central portion.

Japanese Utility Model Laid-Open Publication No. hei 4-91210 discloses a lubricating system disposed in a space defined between a cam chain case and the body of an internal combustion engine to supply lubricant oil to a timing chain (cam chain) for transmitting rotation of a crank shaft to a cam shaft. In this lubricating system, a projecting portion is formed on an oil pump body attached to a cylinder block, and the projecting portion defines an oil path communicating with tan oil path in the cylinder block and an oil jet hole for jetting oil from the oil path toward a portion of the timing chain to be lubricated. Thus, the oil path in the cylinder block and the oil path of the projecting portion are connected through a hollow pin fit in both oil paths when the oil pump body is coupled to the cylinder block.

In the above-introduced structure configured to attach the cam chain case to the engine body, the needs for a number of bolt boss portions at the central portion of the cam chain case and about an opening and the need for a number of bolts inevitably increase the number of parts, and also increase steps for applying and fixing bolts. Therefore, it has been difficult to reduce the cost and the weight.

In the conventional timing chain lubricating system, the need for the hollow pin also involves the drawbak of again increasing the number of parts and the assembling steps. Further, since the projecting portion having the oil path and the oil jet hole is made, in case a bolt boss portion is formed on the cam chain case or the engine body to prevent vibrations of the cam chain case as indicated above, even when a close positional relation is required from the viewpoint of preventing vibrations of the cam chain case and the viewpoint of lubrication of the cam chain, for example, near sprockets the cam chain wraps, existence of the projecting portion in addition to the bolt boss portions may cause a constraint in the positional relation. Thus, it is often difficult to make the bolt boss portions or the projecting portion at appropriate positions.

SUMMARY OF TIE INVENTION

It is therefore an object of the invention to provide a case member mounting structure capable of increasing the bending rigidity of a case member and preventing vibrations of the case member and simultaneously capable of reducing the number of parts and the number of assembling steps and significantly reducing the cost and the weight.

According to the invention, there is provided a case member mounting structure characterized in that at least one projecting portion is formed on one or both of an inner surface of a case member and an outer wall surface of a device body to contact the inner wall surface of the case member having an outer circumferential portion fastened to said device body by a plurality of fastening means and to contact the outer wall surface of the device body on which the case member is to be fastened, and a seal member is provided on a contact surface at a distal end of the projecting portion.

According to the invention, since the fastening means for coupling the projecting portion of the case member to the device body is not required, or the number of parts as the fastening means can be reduced, it is possible to reduce the assembling steps as much as the number of parts reduced, and to significantly decrease the manufacturing cost and the weight.

According to a more preferable aspect of the invention, there is provided a case member mounting structure characterized in that at least one projecting portion is formed on one or both of an inner surface of a case member for covering a driving force transmission mechanism and an outer wall surface of a body of an internal combustion engine to contact the inner wall surface of the case member having an outer circumferential portion fastened to the body by a plurality of fastening means and to contact the outer wall surface of the body on which the case member is to be fastened, and a seal member is provided on a contact surface at a distal end of the projecting portion.

With this structure, bolt boss portions required for fastening the engine case member to the engine body with bolts are not required any more, or decreased. Moreover, the fastening means for coupling the projecting portion of the engine case member to the engine body is not necessary, or the number of parts as the fastening means can be reduced. Therefore, it is possible to reduce the assembling steps as much as the number of parts reduced, and to significantly decrease the manufacturing cost and the weight.

Additionally, unlike the boss portions of the aforementioned conventional technique, which are required to have a diameter greater than the maximum outer diameter of bolts to enable holes to be made for receiving the bolts therethrough or therein, even in case there is no allowance in the space defined between the engine case member and the engine body due to the existence of members disposed in that space, the projecting portions have a larger freedom in shape and size, such as being configured as elongated ribs, and are reduced in restrictions regarding their positional relation. Therefore, the projecting portions can be made in effective locations from the viewpoint of preventing vibrations and noises without disturbing the function of the engine.

The seam member may be a liquid seal member coated on one or both of contact surfaces at distal ends of the projecting portions.

With this structure, as the liquid seal member cures, the projecting portions on the inner surface of the case member are rigidly bonded to the device body or engine body. Alternatively, projecting portions on the outer wall surface of the device body or engine body are rigidly bonded to the case member. Therefore, rigidity against the bending force in directions rectangular to the planar portion of the case member is remarkably increased, and vibrations of the case member are suppressed.

The seal member may be a resilient seam member for engagement with at least one of contact surfaces at the distal ends of the projecting portions.

With this arrangement, the outer wall surface of the device body or engine body and the inner wall surface of the case member are elastically coupled, and transmission of vibrations from the device body or engine body to the case member is prevented.

The contact surfaces at the distal ends of the projecting portions may be configured to lie on a common plane to that of the outer wall surface of the device body or engine body, or of the inner wall surface of the case member fastened to that body.

With this arrangement, since contact surfaces at the distal ends of both projecting portions lie on a common plane to that of the fastening plane between the outer wall surface of the device body, or engine body, and the inner wall surface of the case member, finishing of these contact surfaces and fastening surfaces is simplified, and their workability is improved significantly.

The contact surfaces at the distal ends of the projecting portions may be configured to lie on a plane different from that of the outer wall surface of the device body, or engine body, or from that of the inner wall surface of the case member.

With this structure, the seal member and the resilient member are reliably held at the distal ends of the projecting portions, and they are prevented from dropping.

At least one projecting portion may project from one of the inner wall surface of the case member and the outer wall surface of the device body, or engine body, toward the other.

With this arrangement, the number of projecting portions can be minimized in accordance with arrangement of devices and parts in the space between the outer wall surface of the device body, or engine body, and the inner wall surface of the case member.

According to another aspect of the invention, there is provided a case member mounting structure having a plurality of fastening bolt bosses formed along an outer circumference of a case member for applying a plurality of fastening bolts, respectively, such that the case member is attached to a device body or a body of an internal combustion engine with the fastening bolts, characterized in that the surface of the case member is partitioned into polygonal sections, and respective said polygonal sections define depressed planes and projecting planes bordered by respective sides of the polygons.

With this arrangement, since the area of each plane is decreased, vibrations of the case member surface are suppressed, and noises are reduced as well. Additionally, since the case member can be reduced in thickness, increase of the weight can be prevented. Further, bolt boss portions, which are necessary if fastening the case member to the device body, or engine body, with bolts, can be omitted in locations other than the outer circumferences of the case member. Therefore, positions and shapes of the projecting portions can be selected freely to effectively reduce noises caused by vibration without disturbing the function of the device or engine.

The fastening bolt bosses may be located on extension lines from respective sides of the polygons. As a result, fastening bolt bosses lie on extension lines of respective sides of the polygon, strain of the entire case member is reduced, and vibrations of the entirety are prevented.

Ribs may be formed on the same positions of inner and outer surfaces of the case member, and the ribs may partition the inner and outer surfaces of the case member into polygonal sections.

With this structure, both inner and outer surfaces of the case member are enhanced in strength, vibrations of the entire case member are suppressed, and the case member can be reduced in weight.

The seal member may be of the same type as that of the seal member applied on the outer circumference with which the case member is fastened to the device body or engine body. With this arrangement, the seal members can be reduced in type, application and management of seal members re simplified, and this contributes to reducing the manufacturing cost.

According to a further aspect of the invention, there is provided a case member for covering a driving force transmission mechanism of an internal combustion engine characterized in that a maintenance cover is provided to be detachably mounted at a maintenance opening formed in the driving force transmission mechanism and that a harness of a sensor attached to the case member is integral with the maintenance cover.

With this arrangement, since the hold portion for holding the harness of the sensor is integrally formed on the maintenance cover, the harness of the sensor need not be prepared separately, and this contributes to reducing the number of components, work steps, and the manufacturing cost. Additionally, since the hold portion is integral with the maintenance cover, the maintenance cover itself is enhanced in rigidity.

The hold portion of the maintenance cover may be formed along an inclined surface from the outer circumference of the maintenance cover toward the cover side surface. As a result, vibrations are unlikely to occur even when a vibrating force is applied from the device body or engine body.

According to a still further aspect of the invention, there is provided a case member for covering a driving transmission mechanism which transmits a driving force from a rotary shaft of an internal combustion engine to other portions to be driven, comprising a maintenance cover to be detachably attached at a maintenance opening formed in the case member, a detection sensor attached to the case member to orient toward the mounting position of the maintenance cover for detecting rotation of the rotary shaft, and a hold portion integrally formed on the maintenance cover to hold a harness of the detecting sensor, the harness of the detecting sensor being mounted to the hold portion.

With this structure, length of the harness from the detecting sensor to the hold portion can be reduced, and the harness hold portion can be reduced in number. Additionally, fluctuation in mounting position of the detecting sensor due to vibrations of the harness and abnormal noises can be prevented.

At least one bolt hole for mounting the maintenance cover to the case member may serve as a bolt hole for mounting the case member to the engine body such that the maintenance cover and the case member can be fastened together to the engine with bolts inserted through the maintenance cover and the case member and brought into threading engagement with the engine body.

With this arrangement, since the maintenance cover and the case member are fastened together to the engine body with at least one bolt inserted through the maintenance cover and the case member and brought into threading engagement with the engine body, the maintenance cover and the case member can be firmly attached to the engine body with less bolts.

DESCRIPTION OF THE PREFERRED EMBODIMENTS

Figure 1:
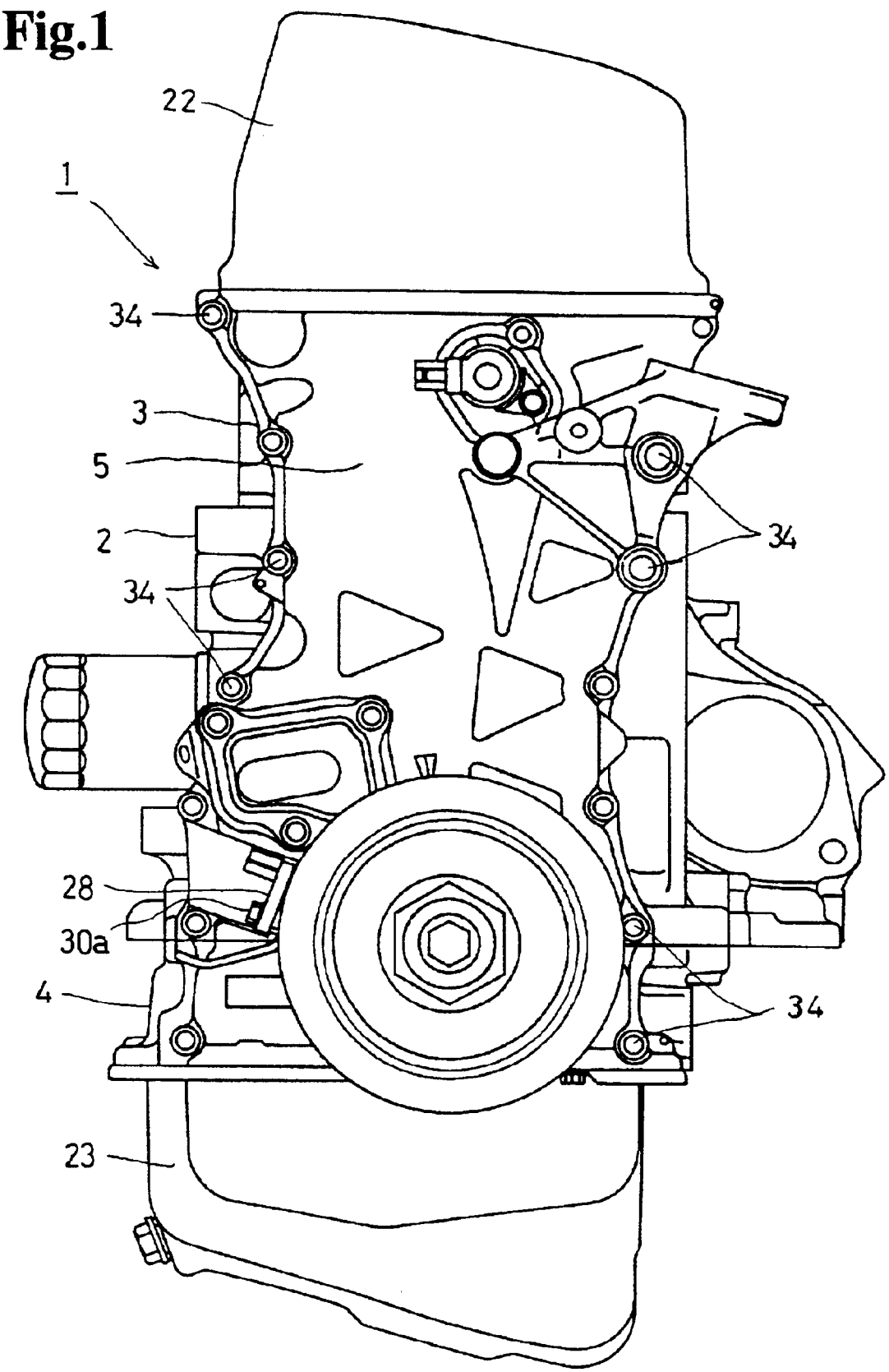
FIG. 1 is a front view of an internal combustion engine having a case member mounting structure according to an embodiment of the invention.

Explained below are embodiments of the invention.

FIGS. 1 through 6 show the first embodiment of the invention, in which an internal combustion engine 1 is a DOHC (double overhead cam shaft) serial 4-cylinder 4-stroke cycle engine to be borne in an automobile. The body of the engine 1 comprises a cylinder block 2, cylinder head 3 disposed above the cylinder block 2, and crank case 4 disposed under the cylinder block 2. The cylinder block 2, cylinder head 3 and crank case 4 are united together by nuts brought into threading engagement with bolts or stud bolts, not shown, and on surfaces of the cylinder block 2, cylinder head 3 and crank case 4 at one side thereof (surfaces shown in FIG. 2), a timing cover 5, as a engine case member, will be detachably mounted rigidly, as will be described later.

Figure 2:
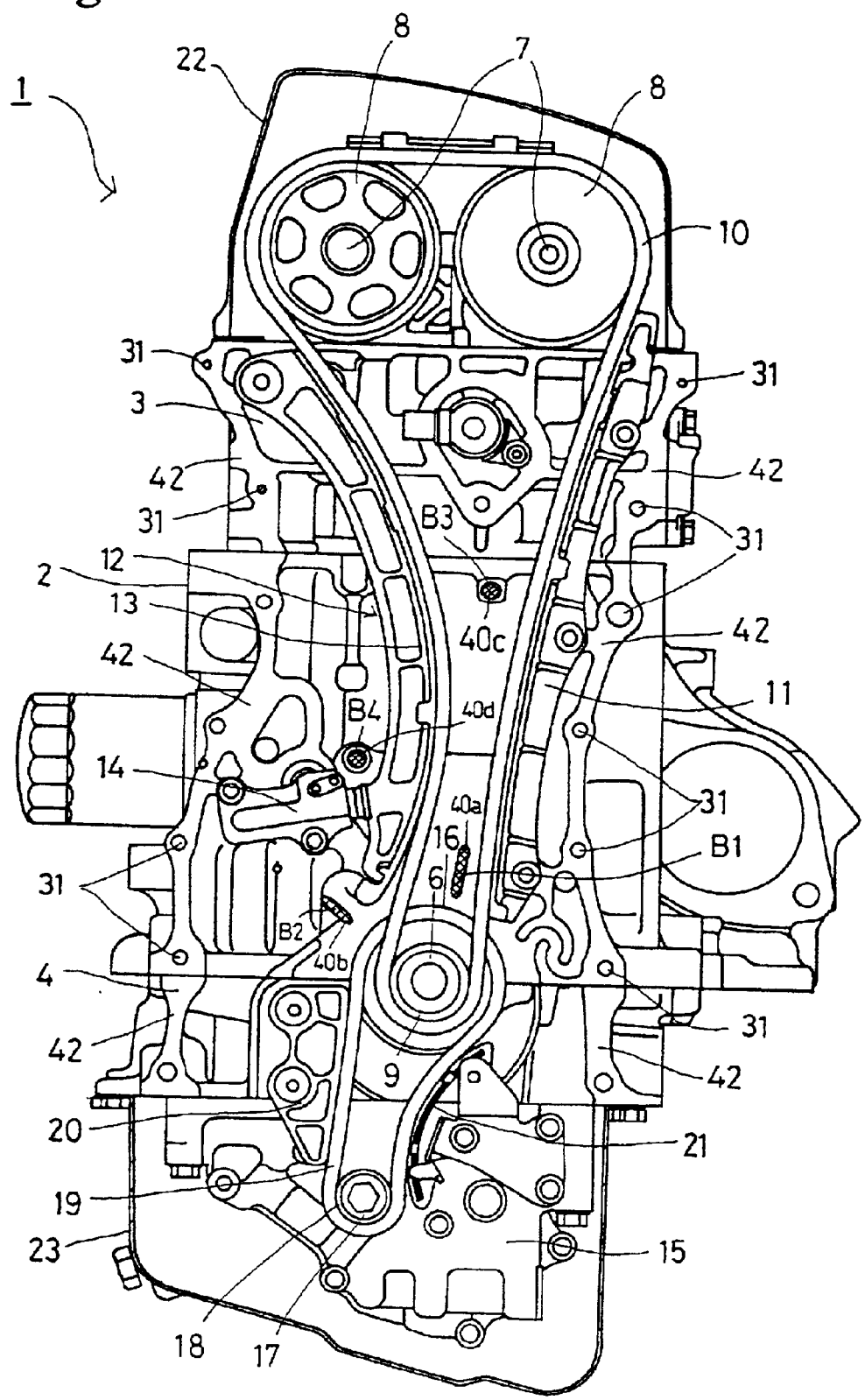
FIG. 2 is a front view corresponding to FIG. 1 but removing a timing cover therefrom.

A crank shaft 6 is pivotally supported at a position of the joint surface between the fitting surface of the cylinder block 2 and the crank case 4, a piston (not shown) is slidably mounted on a cylinder, not shown, which is formed on the cylinder head 3, and the piston and the crank shaft 6 are connected by a connecting rod, not shown, such that the crank shaft 6 is rotated clockwise in FIG. 2 as the piston is reciprocated by combustion gas generated in the combustion chamber of the cylinder.

The cylinder head 3 has air intake and exhaust ports, not shown, which communicate with the top of the cylinder of the cylinder block 2, respectively. Further, air intake and exhaust valves (not shown) for communicating or shutting the air intake and exhaust ports are provided. Air intake and exhaust cam shafts 7 integral with air intake and exhaust cams for opening and shutting the air intake and exhaust valves are rotationally supported on the cylinder head 3. Cam chain-driven sprockets 8 are integrally attached to the air intake and exhaust cam shafts 7. Outside the cylinder block 2, an endless cam chain 10 as a power transmission mechanism wraps a cam chain-driven sprocket 9 integral with the crank shaft 6 and the cam chain-driven sprockets 8. A chain guide 11 is provided on one side (right in FIG. 2) of the cam chain 10, and a chain tensioner 12 is located at the other side of the cam chain 10. The chain tensioner 12 includes a chain guide member 13 with the top end thereof being pivotally supported on the cylinder head 3, and a lifter 14 attached to the cylinder block 2 to urge a bottom portion of a chain guide member 13 and thereby producing a tension force to the cam chain 10. Thus the cam chain 10 is kept tensile without loosening to be smoothly driven in the rate of one rotation of the air intake and exhaust shafts 7 in response to two revolutions of the crank shaft 6.

Further, a lubricant oil pump 15 is attached integrally on the bottom surface of the cylinder block 2. An endless chain 19 wraps a pump drive sprocket 16 integral with the crank shaft 6 and a pump-driven sprocket 18 integral with the lubricant oil pump 15 and the pump rotating shaft 17. A chain guide 20 is located at the other side (left in FIG. 2) of the chain 19, and a chain tensioner 21 is located at one side of the chain 19 such that the resiliency of the chain tensioner 21 itself gives a tensile force to the chain 19.

The top portion of the cylinder block 2 is covered and tightly sealed, and the bottom portion of the cylinder block 2 is covered with an oil pan 23 such that lubricant oil in the engine 1 is stored in the oil pan 23.

Figure 3:
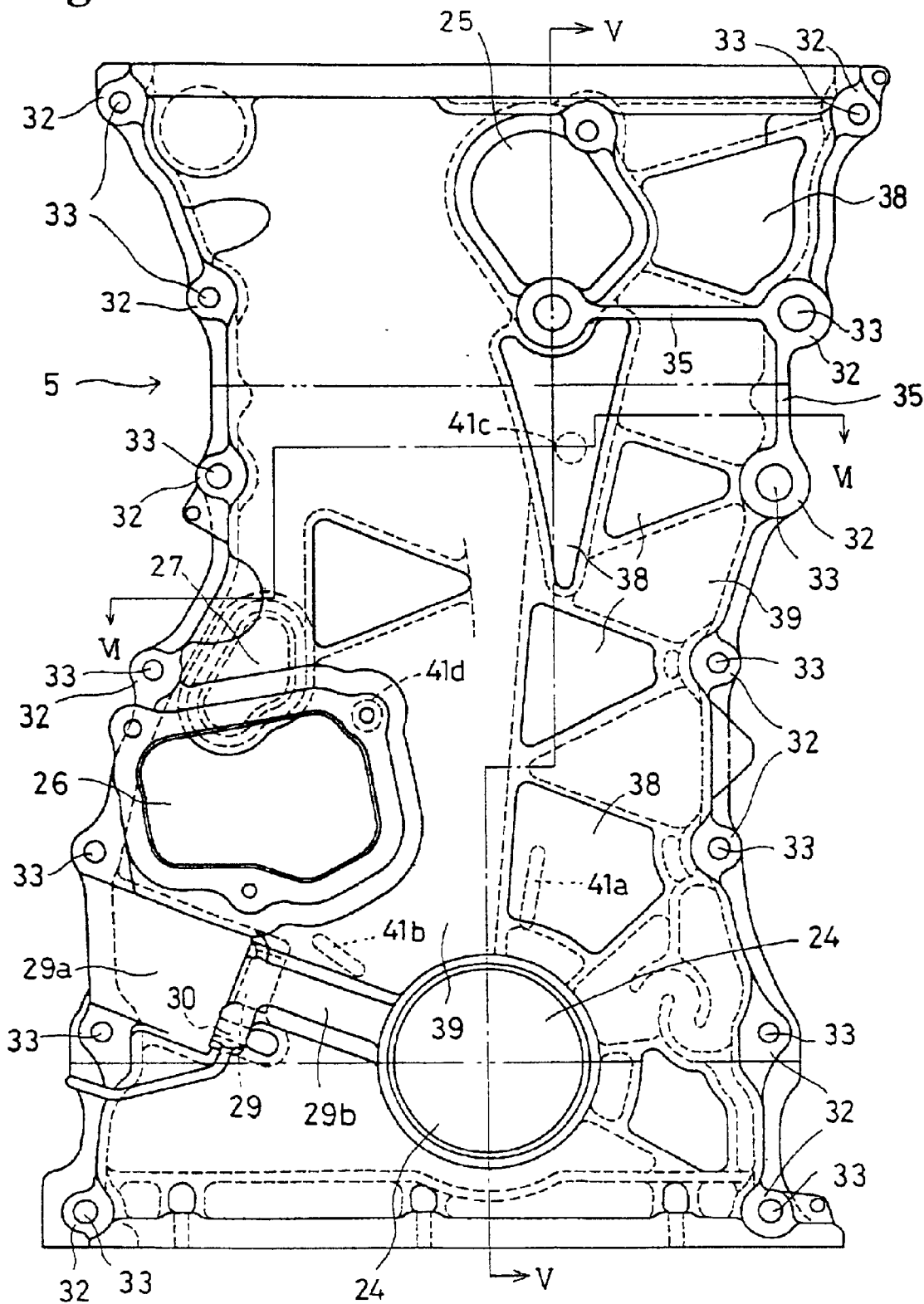
FIG. 3 is a view of the outer surface of the timing cover.

As shown in FIG. 3, below the timing cover 5 that tightly seals one end surface of the body of the engine 1 comprising the cylinder block 2, cylinder head 3 and crank case 4, an opening 24 permitting the crank shaft 6 to path through is formed. Above the timing cover 5, an opening 25 is provided to facilitate checking and exchanging a variable valve timing solenoid of the valve driving system. Additionally, a maintenance opening 26 is provided at a position corresponding to the lifter 14 of the chan tensioner 12, and a lid portion 27 is formed to tightly seal the opening of a lubricant oil path (not shown) of the cylinder block 2.

The timing cover 5 has a sensor fitting portion 29 having a short cylindrical shape, which extends from below the maintenance opening 26 toward the center of the opening 24 to receive and support a rotation detecting sensor 28 for detecting rotation of the crank shaft 6. A portion 29b of the timing cover 5 from the sensor receiving portion 29 toward the opening 24 is bulged outward such that its inner surface defines a substantially semi-circular cylindrical plane. At a portion 29a of the timing cover 5 remoter from the aperture 24 from the sensor receiving portion 29 is depressed inward such that its outer surface defines a substantially semi-circular cylindrical plane. Adjacent to the sensor receiving portion 29, a screw bore 30 is formed such that the rotation detecting sensor 28 inserted into the sensor receiving portion 29 from under the maintenance opening 26 toward the center of the opening 24 is attached to the timing cover 5 with a screw 30a applied into the screw bore 30 passing through the base portion of the rotation detecting sensor 28.

As shown in FIG. 2, a number of screw bores 31 for attaching the timing cover 5 are formed along opposite side edges forming outer peripheries of the cylinder block 2, cylinder head 3 and crank case 4. Along opposite side edges forming outer peripheries of the timing cover 5, mount holes 33 are provided at boss portions 32 corresponding to respective screw bores 31. Thus the timing cover 5 can be detachably attached to the cylinder block 2, cylinder head 3 and crank case 4, which form the main body of the engine 1, with bolts 34 as fastening means that are brought into threading engagement with the screw bores 31 through the mount holes 33.

Figure 4:
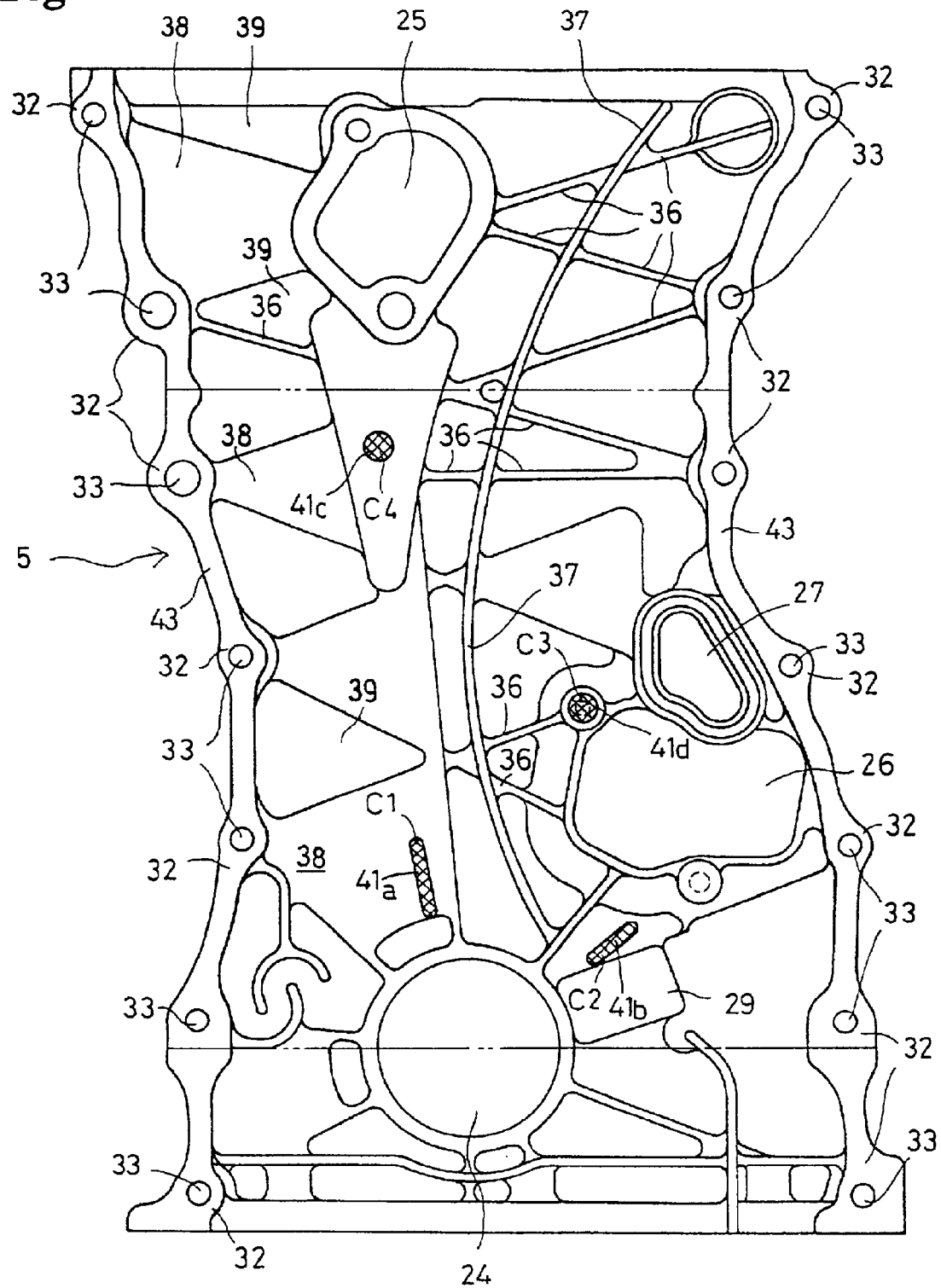
FIG. 4 is a view of the inner surface of the timing cover.
Figure 5:
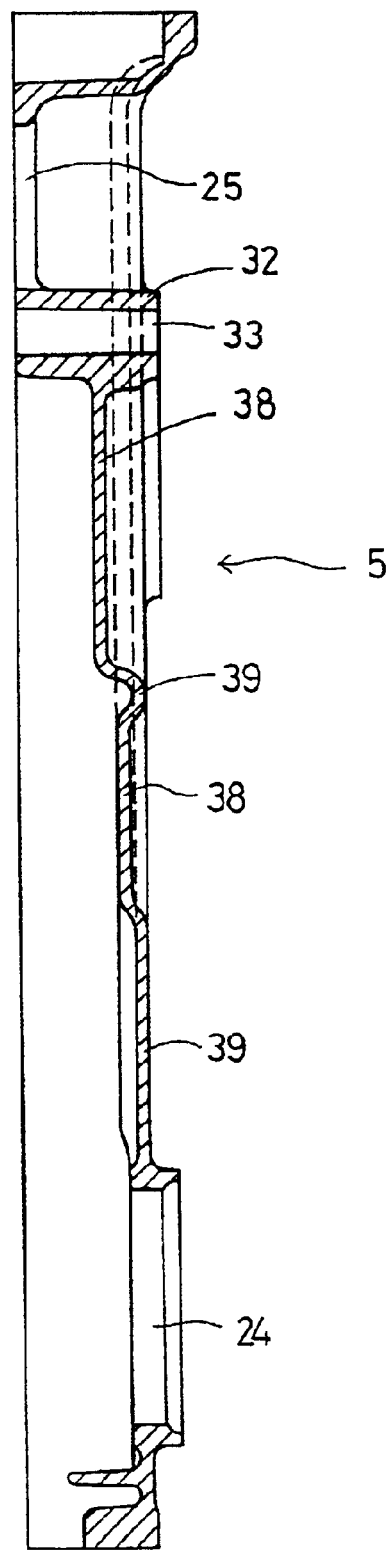
FIG. 5 is a longitudinal cross-sectional view taken along the V—V line of FIG. 3.

Referring to FIG. 3 and FIG. 4, the timing cover 5 has outer ribs 35 on upper portions of the outer surface thereof to linearly connect adjacent boss portions 32. The timing cover 5 also has inner ribs 36 on the inner surface thereof to connect boss portions 32 located at one side of the cylinder block 2, cylinder head 3 and crank case 4 to boss portions 32 located at the other side of the cylinder block 2, cylinder head 3 and crank case 4, and a curved rib 37 arcuately extending along the chain guide member 13 of the chain tensioner 12. In the area surrounded by the inner ribs 36 and the curved rib 37, the timing cover 5 defines inwardly depressed recesses 38 and outwardly raised projecting portions 39, which are also shown in FIG. 5.

Thus, as shown in FIG. 2, from the outer wall surface of the cylinder block 2, projecting portions 40a, 40b, 40c, 40d project outward as projections on the part of the main body in four cross-hatched portions (where they do not interfere the function of the power transmission mechanism of the valve driving system), whereas, as shown in FIG. 4, from the inner wall surface of the timing cover 5, projecting portions 41a, 41b, 41c, 41d, which are cross-hatched projections on the part of the case, project in four locations corresponding to the projections 40a through 40d from the outer wall surface of the cylinder block 2. When the timing cover 5 is mounted on the cylinder block 2, cylinder head 3 and crack case 4, a liquid seal material such as FIPG (Formed In Place Gasket) 44 (see FIG. 6), for example, will be applied onto abutting surfaces B1, B2, B3, B4 as tip surfaces of the projecting portions 40a through 40d and abutting surfaces of C1, C2, C3, C4 as tip surfaces of the projecting portions 41a through 41d. FIPG 44 may be a liquid seal material of a group of silicon rubber, which cures at room temperatures.

FIPG 44 is also coated on side edge portions 42 provided along opposite side edges of the cylinder block 2, cylinder head 3 and crank case 4 to connect a number of boss portions having screw bores 31 and side edge portions 43 provided along opposite side edges of the timing cover 5 to connect a number boss portions 32 when the timing cover 5 is mounted.

Figure 6:
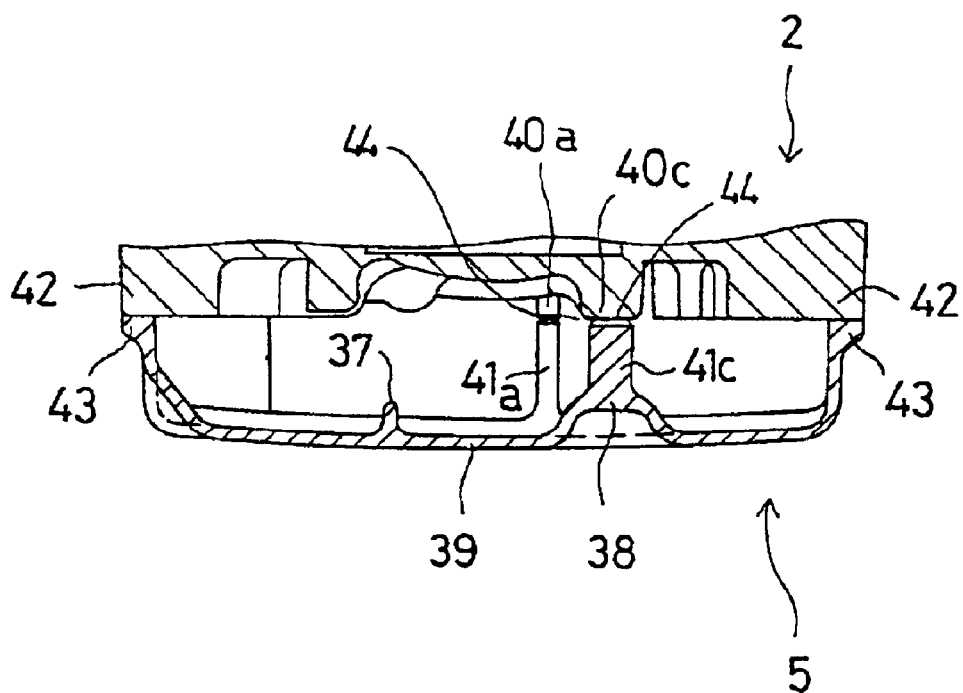
FIG. 6 is a transversal cross-sectional view taken along the VI—VI line of FIG. 3.

As shown in FIG. 6, the abutting surfaces B1 through B4 of the projecting portions 40a through 40d from the cylinder block 2 and the abutting surfaces of the side edge portions of the cylinder block 2, cylinder head 3 and crank case 4 are formed to lie on a common plane. Similarly, the abutting surfaces C1 through C4 of the projecting portions 41a through 41d from the timing cover 5 and abutting surfaces of the side edge portions 43 of the timing cover 5 are formed to lie on a common plane.

The projecting portions 40a, 40b and the projecting portions 41a, 41b are rib-shaped projecting portions extending in radial directions relative to the rotating axial line of the crank shaft 6 from positions near the crank shaft 6 and the outer circumference of the pump drive sprocket having a larger diameter than the cam chain drive sprocket 9 and having elongated abutting surfaces. Because of these shapes, the projecting portions 41a, 41b also function as reinforcing ribs of the timing cover 5, and are effective for preventing vibrations of the timing cover 5 caused around the crank shaft 6 by vibrations of the crank shaft 6 in the rotating axial direction.

Still referring to FIG. 1 through FIG. 6, operations of the first embodiment having the above-explained structure are explained below.

FIPG 44 of a liquid seal material of a group of silicon rubber which sets at room temperature is coated on the abutting surfaces B1 through B4 of the projecting portions 40a through 40d from the cylinder block 2 and the abutting surfaces C1 through C4 of the projecting portions 41a through 41d from the timing cover 5, and FIPG 44 is also coated on abutting surfaces of the side edge portions 42 of the cylinder block 2, cylinder head 3 and crank case r and the side edge portions 43 of the timing cover 5. After that, the side edge portions 43 of the timing cover 5 are put on the side edge portions 42 of the cylinder block 2, cylinder head 3 and crank case 4, and bolts 34 inserted through the mount holes 33 of the timing cover 5 are tightly fixed by threading engagement with the screw bores 31 of the cylinder block, 2, cylinder head 3 and crank case 4. Thus, the timing cover 5 can be attached to one end surface of the cylinder block 2, cylinder head 3 and crank case 4, which form the main body of the engine 1. Therefore, all abutting surfaces of the side edge portions 42 and the side edge portions 43 constitute fastening surfaces.

As FIPG 44 cures due to interaction with moisture in the air, the side edge portions of the timing cover 5 is united together with the side edge portions 42 of the cylinder block 2, cylinder head 3 and crank case 4, and the projecting portions 41a through 41d of the timing cover 5 are united together with the projecting portions 40a through 40d of the cylinder block 2, cylinder head 3 and crank case 4. Therefore, the timing cover 5 is greatly enhanced in rigidity, becomes unlikely to vibrate with a vibrating force rectangular to its plane.

As a result, even when large vibrations occur in the cam chain 10 transported between the cylinder block 2, cylinder head 3 and cranks base 4 and the timing cover 5, the timing cover 5 does not deform yieldingly so much and does not generate noises substantially.

Since the space, which is defined by the cylinder block 2, cylinder head 3 and crank case 4, which form the body of the engine 1, and by the timing cover 5, is tightly sealed with FIPG 44 interposed between the side edge portions 42 of the cylinder block 2, cylinder head 3 and crank case 4 and the side edge portions 43 of the timing cover 5, and the cylinder head cover 22 and the oil pan 23 are tightly attached on the top and bottom end surfaces of the timing cover 5, noises of the cam chain 10 moving in the space do not substantially leak externally.

Further, since the abutting surfaces B1 through B4 of the projecting portions 40a through 40d from the cylinder block 2 and the abutting surfaces of the side edge portions 42 of the cylinder block 2, cylinder head 3 and crank case 4 lie on a common plane and the abutting surfaces C1 through C4 of the projecting portions 41a through 41d of the timing cover 5 and the abutting surfaces of the side edge portions 43 of the timing cover 5 lie on a common plane, these abutting surfaces of the projecting portions 40a through 40d, side edge portions 42 and projecting portions 41a through 41d and side edge portions 43 can be worked very easily, and this results in a high productivity.

Furthermore, even if hare is a large distance between the outer wall surface of the cylinder block 2 and the inner wall surface of the timing cover 5, since four projecting portions 41a through 41d are raised from the inner wall surface of the timing cover 5 at locations to be reinforced, and their abutting surfaces C1 through C4 are firmly bonded to the abutting surfaces B1 through B4 of the projecting portions 40a through 40d from the outer wall surface of the cylinder block 2 with FIPG 4 of a liquid seal material cured, the timing cover 5 is remarkably enhanced in rigidity and strength, and greatly improved in resistance to vibration and noise insulation.

Although the projecting portions 41 through 41d of the timing cover 5 project at locations not linked to the inner ribs of the timing cover 5, the inner ribs 36 may be configured to project toward the cylinder block 2 and may be bonded with FIPG 44 to corresponding rib-shaped projections formed on the part of the cylinder block 2. In this manner, it is possible to increase the bonding area of FIPG 44 and thereby bond central portions of the timing cover 5 to the cylinder block 2 more firmly.

Additionally, since the projecting portions 40a through 40d of the cylinder block 2 and the projecting portions 41a through 41d of the timing cover 5 need not be formed on boss portions for applying bolts, that is, unlike the boss portions of the aforementioned conventional technique, which are required to have a diameter than the maximum outer diameter of bolts to enable holes to be made for receiving the bolts therethrough or therein, even in case there is no allowance in the space defined between the cylinder block 2, cylinder head 3 and crank case, and the timing cover 5 due to the existence of the cam chain 10, cam chain drive sprocket 9, pump drive sprocket 16, chain 19, chain tensioner 12, and other members disposed in that space, the projecting portions 40a through 40d and the projecting portions 41 through 41d having a larger freedom in shape and size are reduced in restrictions regarding their positional relation, and can be made in effective locations from the viewpoint of preventing vibrations and noises. Thus by selecting locations not interfering the function of the power transmission mechanism of the valve driving system, it is possible to interrupt noises and prevent vibrations of the timing cover 5 more effectively.

The projecting portions 40a through 40d of the cylinder block 2 and the projecting portions 41a through 41d of the timing cover 5 may be shaped in form of bosses, if necessary.

In addition, it will be advantageous to make the projecting portions 40a through 40d of the cylinder block 2 and the projecting portions 41a through 41d of the timing cover 5 to lie on common planes together with the side edge portions 42 of the cylinder block 2 and the side edge portions 43 of the timing cover 5, respectively, from the viewpoint of facilitating their working. However, if the projecting portions 41 through 41d of the timing cover 5 are slightly longer than the side edge portions 43 of the timing cover 5, then the bonding between projecting portions 40a through 40d of the cylinder block 2 and the projecting portions 41 through 41d of the timing cover 5 will be further reinforced when the timing cover 5 is fastened to the cylinder block 2.

Moreover, since the projecting portion 41c is provided in the recess 38 (see FIG. 6) of the timing cover 5, the length of the projecting portion 41c may be shorter and can be worked easily, and even in case the projecting portion 41c is thin, it can be accurately put into contact with the projecting portion 40c of the cylinder block 2. This is especially effective in structures in which projecting portions 40a through 40d and projecting portions 41a through 41d are provided on the cylinder block 2 and the cylinder head 3, and the timing cover 5, respectively.

In addition, since the projecting portion 41d of the timing cover 5 is formed integrally with the rib 36 provided on the inner surface of the timing cover 5 as shown in FIG. 4, the effect of reducing vibrations is improved significantly.

Furthermore, since the projecting portions 41a, 41c are disposed in the space surrounded by the cam chain 10 that is an endless elongated power transmission mechanism, they can be disposed near the driving section, using a dead space, without adversely affecting movements of the cam chain 10.

Figure 7:
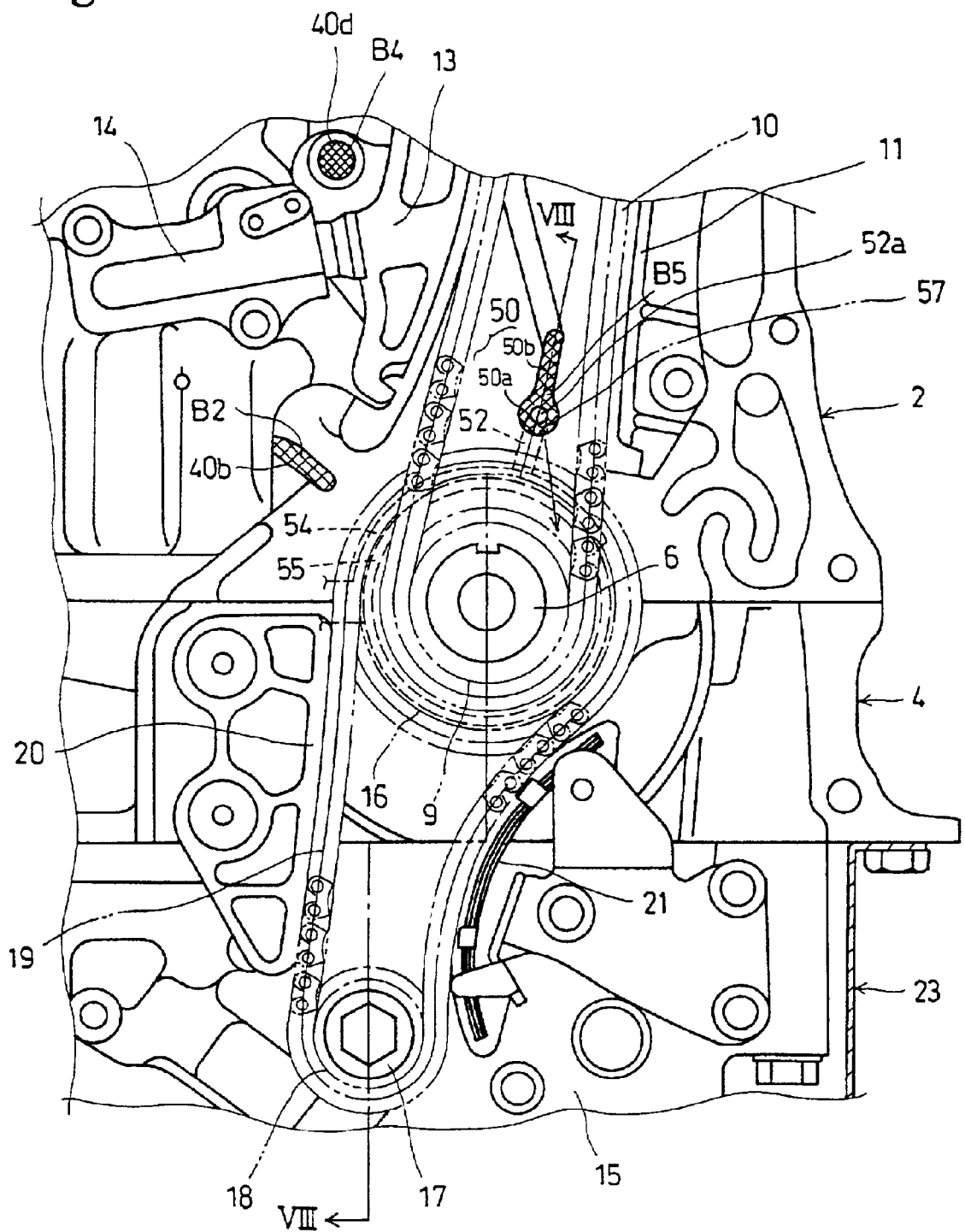
FIG. 7 is a partial front view of a second embodiment of the invention, from which the timing cover is removed similarly to FIG. 2.
Figure 8:
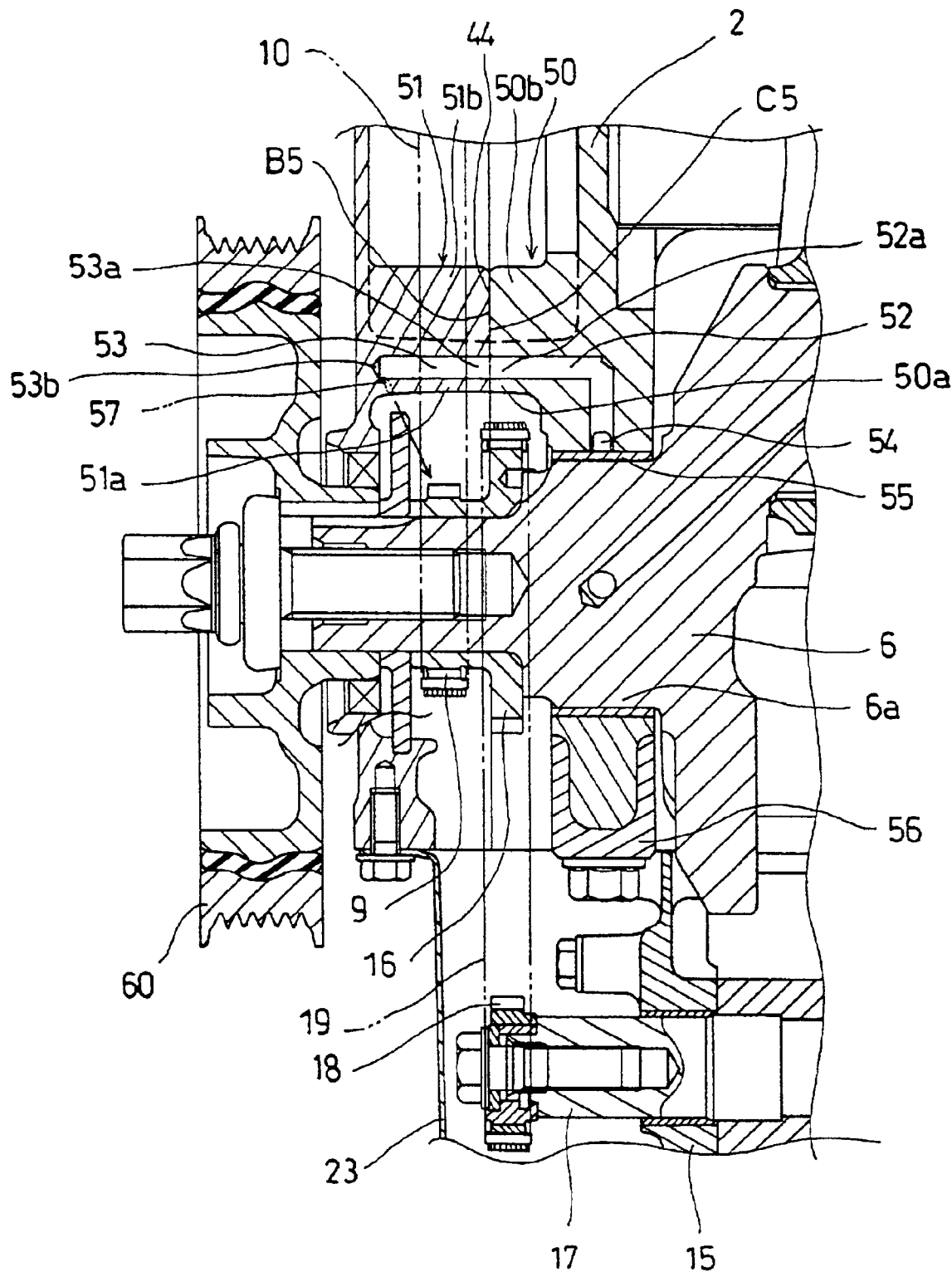
FIG. 8 a longitudinal cross-sectional view taken along the VIII—VIII line of FIG. 7, with the timing cover attached.

Next explained is the second embodiment of the invention with reference to FIGS. 7 and 8. The second embodiment is different from the first embodiment mainly in the projecting portion 40a and the projecting portion 41a and basically the same in the other respects. Therefore, explanation is omitted or simplified about the same portions as those of the first embodiment, and the same reference numerals are labeled to the same portions as the members of the first embodiment.

In the second embodiment, a projecting portion 50 as a projection formed on the part of the main body and a projecting portion 51 as a projection formed on the part of the case, which correspond to the projecting portion 40a and the projecting portion 41a of the first embodiment, have oil paths 52, 53, and they are configured as projections with oil paths. Then, each projecting portion 50, 51 includes a column-shaped portion 50a, 51a having a substantially circular transversal cross section, and a rib-shaped portion 50b, 51b elongated to extend radially outward from the outer circumferential surface of the column-shaped portion toward the cylinder head 3.

An oil path 52 is formed in the projecting portion 50 as an oil path on the part of the main body, which has one end defining an opening 52a opening to an abutting surface B5 with the projecting portion 51 and the other end connecting to an arcuate oil supply path 54 in form of a channel made in the circumferential wall surface of a semi-circular shaft bore made in the cylinder block 2 for supporting a main bearing 55 to extend in the circumferential direction. The oil supply path 54 is configured to supply lubricant oil between an end journal 6a of the crank shaft 6 and the main bearing 55 supported by the cylinder block 2 and a bearing cap 56, and communicates with a main gallery (not shown) formed in the cylinder block 2.

On the other hand, an oil path 53 is formed in the projecting portion 51 as an oil path on the part of the case, which has one end defining an opening 53a opening to an abutting surface C5 with the projecting portion 50 and communicating with the oil path 52 on the abutting surface B5, and the other end serving as a sealed portion 53b sealed at the bottom portion of the projecting portion 51. Therefore, the oil path 53 constitutes an oil path communicating with the oil supply path 54 via the oil path 52. An injection hole 57 is further formed in the projecting portion 51, which injects lubricant oil from near the sealed portion 53b of the oil path, directing the cam chain 10 and the cam chain drive sprocket 9 (the arrow-marked direction in the drawing) near the location where the cam chain drive sprocket 9 engages with the cam chain 10. Therefore, the projecting portion 51 is an oil supply projecting portion including the oil path 53 and the injection hole 57.

Since the injection hole 57 is configured to ensure the injected lubricant oil to contain components toward the cylinder block 2, part of the injected lubricant oil is supplied also to the pump drive sprocket 16 and the chain 19 that are adjacent to the cam chain drive sprocket 9 and nearer to the cylinder block 2.

Note that FIPG 44 is coated on the abutting surfaces B5 and C5 of the projecting portions 50 and 51, and in the column-shaped portions 50a, 51a, it is coated on the abutting surfaces B5, C5 around the openings 52a, 53a of the respective oil paths 52, 53 over the entire circumferences thereof, in a manner prohibiting FIPG 44 from intruding into any of the oil paths 52, 53 as much as possible upon abutment of these projecting portions 50, 51.

In this fashion, according to the second embodiment, in which an oil supply device to the cam chain 10 and the cam chain drive sprocket 9 is made by forming the oil paths 52, 53 in the projecting portions 50, 51 coupled by FIPG 44 to communicate with the oil supply path 54 and forming the injection hole 57 in the projecting portion 51 to jet lubricant oil from the oil path 53 toward the cam chain 10 and the cam chain drive sprocket 9, not only the same operations and effects as those of the first embodiment but also the following operations and effects are obtained.

Lubricant oil pumped from the lubricant oil pump 15 and supplied through the main gallery to the supply path 54 is sent to the oil path 53 via the oil path 52, and injected from the injection hole 57 of the projecting portion 51 toward the cam chain 10 and the cam chain drive sprocket 9. Then, oil films made of the injected lubricant oil adhering onto the can chain 10 and the cam chain drive sprocket 9 reduce rattling sounds produced by contact between the cam chain 10 and the cam chain drive sprocket 9. Similarly, oil films made of the injected lubricant oil adhering onto the chain 19 and the pump drive sprocket 16 reduce rattling sounds produced by the chain 19 and the pump drive sprocket 16. Thereby, noises are reduced.

Additionally, since the injection hole 57 is made in the projecting portion 51 coupling the timing cover 5 and the cylinder block 2 to prevent vibrations of the timing cover 5, it does not need a space so wide as the space required for separately making a projection exclusive for making an injection hole 57. Therefore, even in case the projecting portion 51 and the injection hole 57 are preferably located closely, for example, near the cam chain drive sprocket 9 wrapped by the cam chain 10, from both viewpoints of preventing vibrations of the timing cover 5 and lubrication of the cam chain 10, they can be located appropriately.

Further, since the timing cover 5 and the cylinder block 2 are united together by bonding the projecting portion 51 to the projecting portion 50, acceptable location for the injection hole 57 can be readily enlarged in the space between the timing cover 5 and the cylinder block 2 in the projecting direction of the projecting portion 51 and nearer to the timing cover 5, and freedom in selecting the location for the injection hole 57 and selecting the injection direction of lubricant oil to be supplied to the cam chain 10 and the cam chain drive sprocket 9 can be enlarged more.

Regardless of connection of the oil paths 52, 53 at the abutting surfaces B5, C5, since FIPG 44 bonding the projecting portions 50, 51 together over the entire circumferences of the openings 52a, 53a of the oil paths 52, 53 exist in the abutting surfaces B5, C5, leakage of lubricant oil from the joint between the oil paths 52, 53 can be prevented without providing a seal member such as O-ring separately.

Although each of the foregoing embodiments uses the invention to the timing cover covering the power transmission mechanism of the valve driving system, the invention may be used in the cylinder head cover 22 or oil pan 23 instead of the timing cover 5.

Although four projecting portions 40a through 40d are provided on the cylinder block 2 constituting the main body of the engine 1 and four projecting portions 40*a* through 40*d* are provided on the timing cover 5, those projecting portions may be at least one for each of the main body of the engine and the timing cover 5.

Alternatively, such a projecting portion or projecting portions may be provided on only one of the main body of the engine 1 and the timing cover 5 such that the projecting portion or portions are bonded to the other of the main body of the engine 1 and the timing cover 5 with FIPG 44. Further, at least one of such projecting portions may be configured as an oil supplying projecting portion. In this case, position for the injection hole 57 can be selected in the range over the full width in the projecting direction of the projecting portion within the space between the main body of the engine and the timing cover 5, freedom of selecting location for the injecting hole 57 and the injecting direction of lubricant oil to the cam chain 10 is further increased. Thus the injection hole 57 can be made at an optimum position for supplying oil to the cam chain 10, such as locating it at any location avoiding obstacles disturbing the supply of oil to the cam chain 10, for example.

Further, although the case member used in the first embodiment is the timing cover of the engine 1, it may be such of a device other than the engine 1. In this case, the case member is fastened to the main body of that device.

Although the projecting portions with oil paths used in the second embodiment are projecting portions 50, 51, i.e. one of the projecting portions 40*a* through 40*c* and 50 formed on the cylinder block 2 and one of the projecting portions 41*a* through 41*c* and 51 formed on the timing cover 5, more of the projecting portions 40*a* through 40*c* and 50 and more of the projecting portions 41*a* through 41*c* and 51 may be used and configured as projecting portions with oil paths for supplying oil. Furthermore, the projecting portion 50 may be also provided with an injection hole to function as an oil supplying projecting portion, such that simultaneously with injection of lubricant oil from the injection hole 57 of the projecting portion 51, lubricant oil is injected also to the cam chain 10 and the cam chain drive sprocket 9. In addition, a projecting portion similar to the projecting portion 50 may be formed on the crank case 4 within the space surrounded by the chain 19 to inject lubricant oil from the injection hole 57 to the chain 19 and the pump drive sprocket 16.

Figure 9:
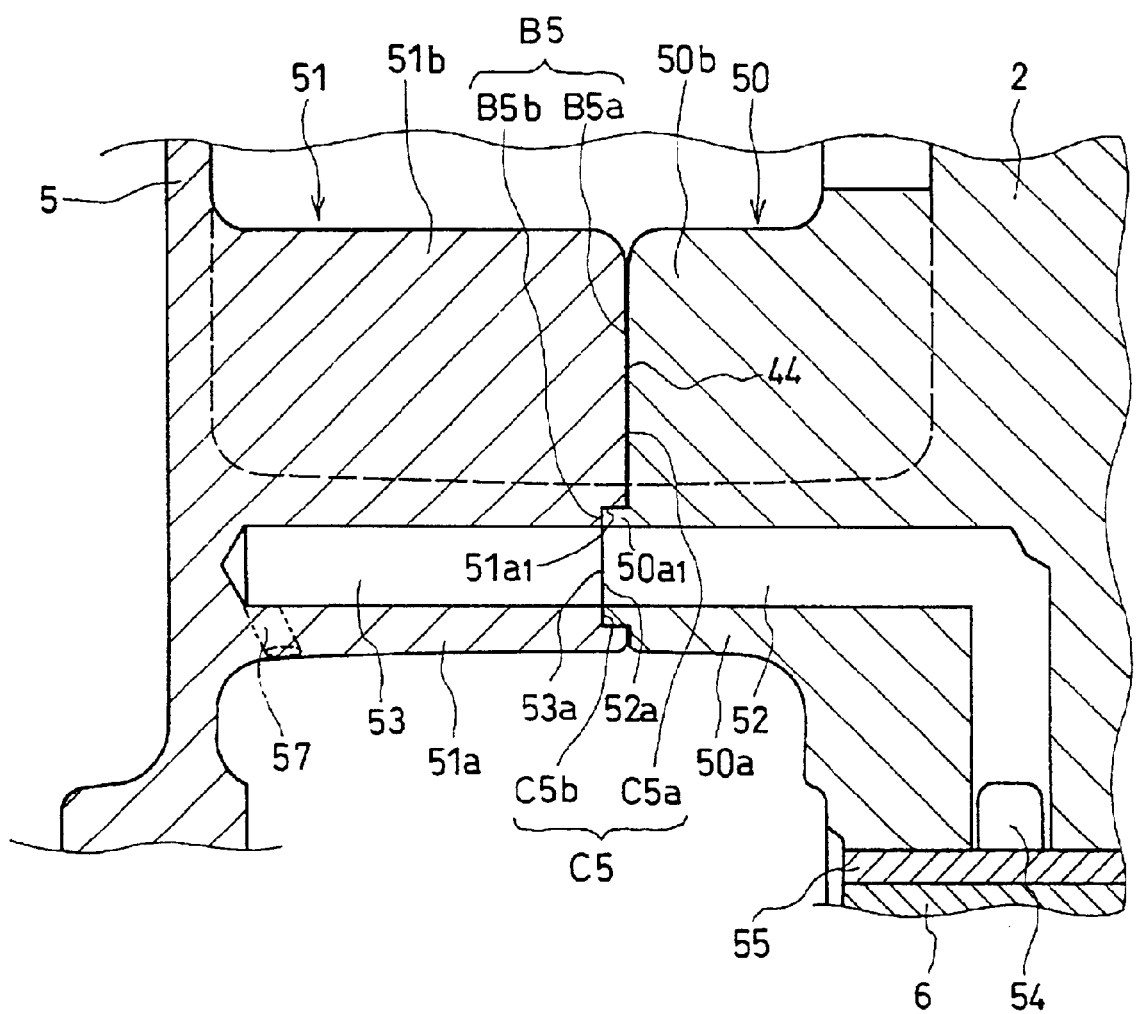
FIG. 9 is a partial, enlarged view of the second embodiment, illustrating a projecting portion modified in shape.

In the second embodiment, in order to reliably prevent entry of FIPG 44 into the oil paths 52, 53, the projecting portions 50, 51 may be configured as shown in FIG. 9, for example. That is, the abutting surface B5 of the projecting portion 50 is configured as a stepped abutting surface by making a cylindrical projection 50*a*1 smaller in diameter than the column-shaped portion 50*a* to encircle the opening 52*a* in the column-shaped portion 50*a*, and as a result, the abutting surface B5 includes a first abutting surface B5*a* that lies on the common plane to the abutting surfaces of the side edge portions 42 of the cylinder block 2, cylinder head 3 and crank case 4, and is coated with FIPG 44, and a second abutting surface B5*b* that defines a top surface parallel to the first abutting surface B5*a* to abut an abutting surface C5*b* of a recess 51*a*1 of the projecting portion 51, which will be explained later.

Further, the abutting surface C5 of the projecting portion 51 is configured as a stepped abutting surface by making a projection 51*a*1 in form of a blind circular hole larger in diameter than the opening 53*a* and slightly larger in diameter than the projection 50*a* to receive it. As a result, the abutting surface C5 includes a first abutting surface C5*a* that lies on the common plane to the abutting surfaces of the side edge portions 43 of the timing cover 5 and is coated with FIPG 44, and a second abutting surface C5*b* that is a bottom surface of the recess 51*a*1, which is parallel to the first abutting surface C5*a*, for abutment with the second abutting surface B5*b* of the projecting portion 50.

Therefore, the openings 52*a*, 53*a* of both oil paths 52, 53 are located in the second abutting surfaces B5*b*, C5*b* offset from the first abutting surfaces B5*a*, C5*a* to be coated with FIPG 44 along the center line of the column-shaped portion, and even when both first abutting surfaces B5*a*, C5*a* are brought into abutment upon coupling the timing cover 5 with the cylinder block 2, cylinder head 3 and crank case 4, FIPG 44 coated on these first abutting surfaces B5*a*, C5*a* and not yet curing is prohibited from intruding from the openings 52*a*, 53*a* into the oil paths 52, 53. Thus the projection 50*a*1 of the projecting portion 50 and the recess 51*a*1 of the projecting portion 51 each constitute an intrusion prohibiting structure that prevents intrusion of the FIPG 44, being liquid sealing members, into the oil paths 52, 53.

In each of the foregoing embodiments, the power transmission mechanism is that of a valve driving system. However, it may be that of a driving system of au auxiliary machinery other than the valve driving system. Additionally, although a chain is used as the power transmission mechanism, gearing or a belt may be used instead of a chain.

Next explained is a modification of the above-explained embodiment.

In the foregoing embodiment, the abutting surfaces B1 through B4 of the projecting portions 40*a* through 40*d* from the cylinder block 2, cylinder head 3 and crank case 4 and the abutting surfaces of the side edge portions 42 of the cylinder block 2, cylinder head 3 and crank case 4 are configured to lie on a common plane, and the abutting surfaces C1 through C4 of the projecting portions 41*a* through 41*d* from the timing cover 5 and the abutting surfaces of the side edge portions 43 of the timing cover 5 are configured to lie on a common plane. However, as shown in FIG. 10 and FIG. 11, the timing cover 5 can be shaped such that the projected length of a projecting portion 41*e* of the timing cover 5 is short, and an abutting surface C5 of the projecting portion 341*e* is located nearer to the main body of the timing cover 5 than the plane of the abutting surfaces of the side edge portions 43 of the timing cover 5.

Figure 10:
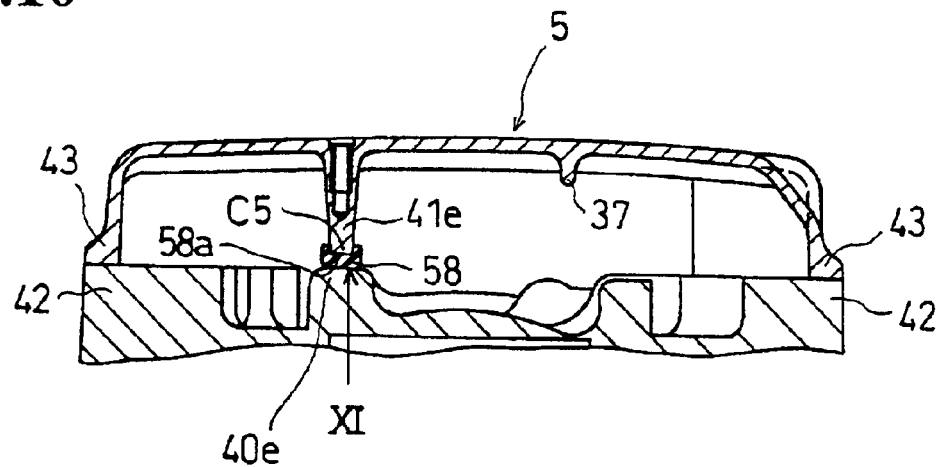
FIG. 10 is a transversal cross-sectional view of a further embodiment different from the embodiment shown in FIGS. 1 through 6.
Figure 11:
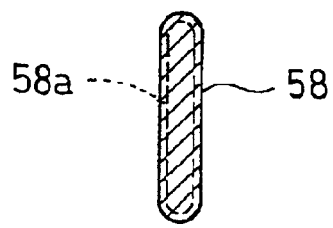
FIG. 11 is a view taken from the direction shown by the arrow XI in FIG. 10.

Then, although the foregoing embodiments interpose the liquid seal material 44 of a group of silicon rubber curable at room temperatures between the abutting surfaces of the side edge portions 42 of the cylinder block 2, cylinder head 3 and crank case 4 and the abutting surfaces of the side edge portions 43 of the timing cover 5, in the embodiment shown in FIGS. 10 and 11, resilient rubber 58 depressed in its central portion is prepared, and the depression 58*a* of the resilient rubber 58 engages with the tip of the projecting portion 41*e* of the timing cover 5.

In this embodiment, vibrations of the central portion of the timing cover 5 are damped by the resilient rubber 58, and transmission of vibrations of the central portion of the timing cover 5 to the projecting portion 40*e* of the cylinder block 2, cylinder head 3 and crank case 4 is alleviated significantly.

Figure 12:
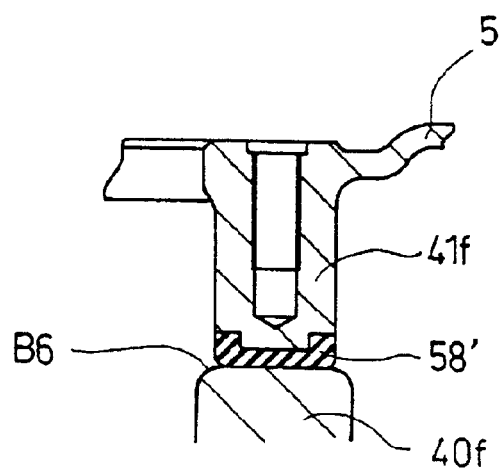
FIG. 12 is a partial, enlarged, transversal cross-sectional view different from the modification shown in FIGS. 10 and 11.

In the structure shown in FIG. 12, in which a projecting portion 41*f* of the timing cover 5 is configured to have a tip whose central portion projects longer than the remainder portion around it such that the projecting portion 41*f* engages with resilient rubber 58', the abutting surface B6 of the projecting portion 40*f* of the cylinder block 2, cylinder head 3 and crank case 4, which is brought into abutment with the projecting portion 41f of the timing cover 5, can be narrowed, and these projecting portions 40f, 41f can be made compact.

Figure 13:
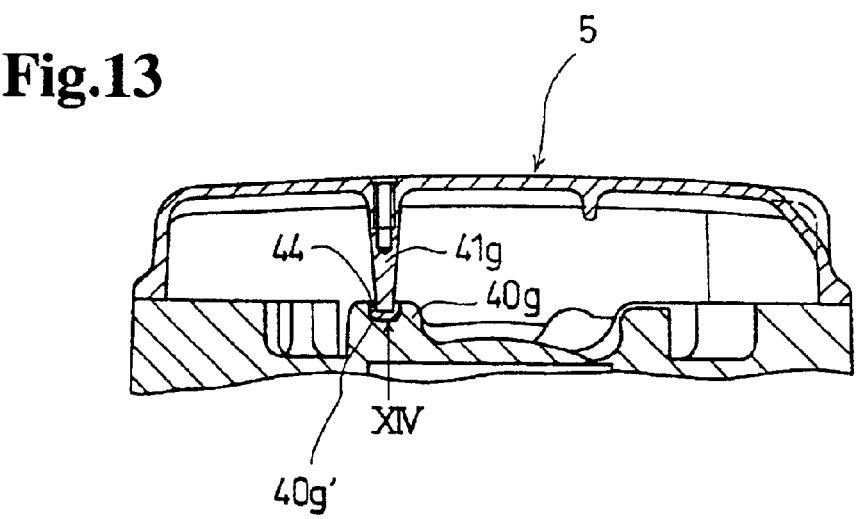
FIG. 13 is a partial, enlarged, transversal cross-sectional view of a further embodiment different from the embodiment shown in FIGS. 10 through 12.
Figure 14:
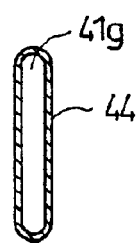
FIG. 14 is a view taken from the direction shown by the arrow XIV in FIG. 13.
Figure 15:
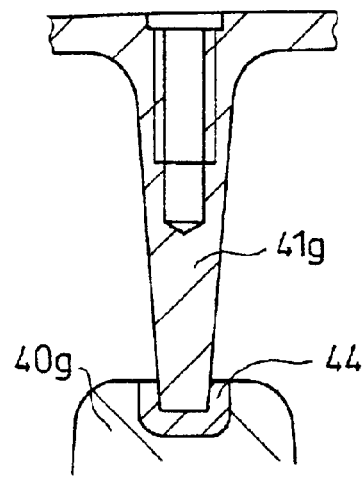
FIG. 15 is a partial, enlarged cross-sectional view of a modification of a part of the embodiment shown in FIGS. 13 and 14.

Further, in the structure shown in FIG. 13 through FIG. 15, a projecting portion 41g of the timing cover 5 is configured to have a tip whose central portion projects outward rather than the plane of the abutting surfaces of the side edge portions 43 of the timing cover 5, and a projecting portion 40g on the part of the cylinder block 2, cylinder head 3 and crank case 4 has a depression 40g' that can loosely receive the projecting portion 41g of the timing cover 5 and is filled with a liquid sealing material 44. With this structure, the projecting portion 41g of the timing cover 5 can be held stably against forces or vibrations in directions rectangular to the lengthwise direction.

Figure 16:
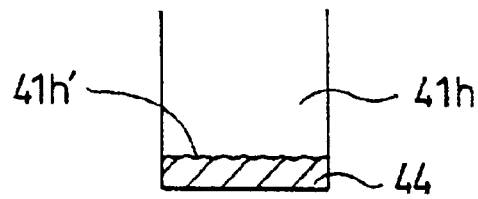
FIG. 16 is a partial, enlarged cross-sectional view of a modification of a part of the embodiments shown in FIGS. 13 through 15.

Furthermore, a projecting portion 41h of the timing cover 5 may have an uneven tip surface 41h' as shown in FIG. 16, and a liquid sealing material 44 may be coated on the tip uneven surface 41h'. With this structure, the projecting portion 41h of the timing cover 5 need not be processed.

Figure 17:
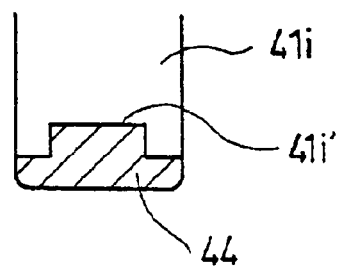
FIG. 17 is a partial, enlarged cross-sectional view of a further modification of the embodiment shown in FIG. 16.

Additionally, as shown in FIG. 17, a tip surface 41i' of a projecting portion 41i of the timing cover 5 may be shaped to have a depression in the center, and a liquid sealing material 44 may be coated on the tip surface 41i'. With this structure, the liquid sealing material 44 can be held stably on the tip surface 41i' of the projecting portion 41i of the timing cover 5.

Figure 18:
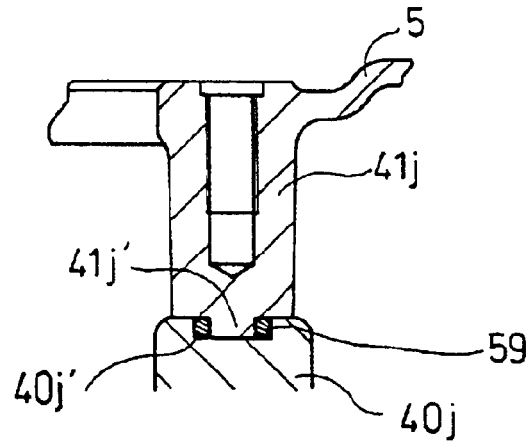
FIG. 18 is a partial, enlarged cross-sectional view of a still further embodiment different from the embodiments shown in FIGS. 10 through 17.

As shown in FIG. 18, the timing cover 5 may have a projecting portion 41j whose tip 41j' is configured to project outward (downward in FIG. 18) beyond the plane X of the side edge portions 42 of the cylinder block 2, cylinder head 3 and crank case 4, not shown here, and the tip 40j for abutment with a projecting portion 41j of the timing cover 5 includes a depression that can loosely receive the tip 41j' of the projecting portion 41j of the timing cover. An O-ring 59 is interposed between the tip depression 40j' of the projecting portion 40j on the part of the cylinder block 2, cylinder head 3 and crank case 4, and the tip 41j' of the projecting portion 41j of the timing cover 5. If the thickness of the O-ring 59 is slight larger than the depth of the tip depression 40j', the sealing performance and the anti-vibration effect are improved.

Figure 19:
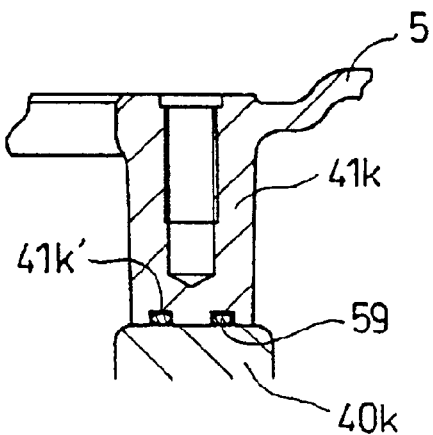
FIG. 19 is a partial, enlarged cross-sectional view of a yet further embodiment different from the embodiments shown in FIGS. 10 through 18.

As shown in FIG. 19, the timing cover 5 may have a projecting portion 41k having at the tip thereof a concentric ring-shaped depression 41k', and an O-ring 47 may be received in the ring-shaped depression 41k'. Here again, the O-ring 47 can be held reliably on the projecting portion 41k of the timing cover 5.

FIGS. 20 through 28 illustrate a further embodiment of the invention. The same structures as those of the embodiment shown in FIGS. 1 through 6 are labeled in FIGS. 20 through 28 by using common reference numerals, but their explanation is omitted here.

On an upper portion of the outer surface of the timing cover 5, there are formed outer ribs 35a, 35b linearly connecting adjacent fastening bolt bosses 32A, 32B, 32C. On the other hand, the timing cover 5 has inner ribs 36 on the inner surface thereof to connect fastening bolt bosses 32 located at one side of the cylinder block 2, cylinder head 3 and crank case 4 to fastening bolt bosses 32 located at the other side of the cylinder block 2, cylinder head 3 and crank case 4, and a curved rib 37 arcuately extending along the chain guide member 13 of the chain tensioner 12. In the area surrounded by the inner ribs 36 and the curved rib 37, the timing cover 5 defines inwardly depressed surfaces 38 and outwardly raised projecting surfaces 39.

More specifically, the plane of the timing cover 5 is partitioned into a number of polygonal sections by inner ribs 36 and others, and the fastening bolt bosses 32 are located on extension lines of respective sides of the polygons. Thus the depressed surfaces 38 and the projecting surfaces 39 are defined by boundaries that are sides of the polygons. These depressed and projecting surfaces 38, 39 are not limited to planes surrounded by ribs connecting the fastening bolt bosses 32, but may be partitioned by any ribs including other ribs formed on the inner surface of the timing cover 5. It is sufficient that adjacent surfaces constitute depressed surfaces and projecting surfaces.

When the plane of the timing cover 5 is partitioned into triangular sections as one sort of polygons, area of each section is minimized, and the anti-vibration effect is further improved.

In the embodiment shown in FIGS. 20 through 26, the timing cover 5 is put on one end surface of the cylinder block 2, cylinder head 3 and crank case 4, the fastening bolts 34 inserted through the mount holes 33 of the fastening bolt bosses 32 on the timing cover 5 are next brought into engagement with the screw bores 31 on the part of the cylinder block 2, cylinder head 3 and crank case 4, the cylinder head cover 22 is attached to the cylinder head 3, and the oil pan 23 is attached to the crank case 4. Thereby, the driving force transmission mechanism of the valve driving system of the engine 1 is completely sealed.

In the embodiment shown here, since the timing cover 5 is partitioned in detail to form depressed and projecting surfaces, it is more effective in suppressing vibrations than structures having ribs standing up from a common plane, and generation of noises is prevented as well. That is, by reducing the area of each plane, the cross-section is effectively made to be discontinuous without increasing the weight. Thus it is possible to prevent resonance of the plane of the timing cover 5 and accelerate attenuation. Further, since such depressed and projecting planes are defined by using the ribs connecting the fastening bolt bosses 32 as their boundaries, the timing cover 5 is unlikely to be strained between adjacent fastening bolt bosses 32, and a greater effect of preventing noises is ensured. Additionally, since the fastening bolt bosses 32 along the peripheral edges of the timing cover 5 are connected together, it contributes to preventing strain of the entire timing cover 5, alleviating fluctuation of the entire timing cover 5 and improving rigidity of the entire timing cover 5.

Figure 20:
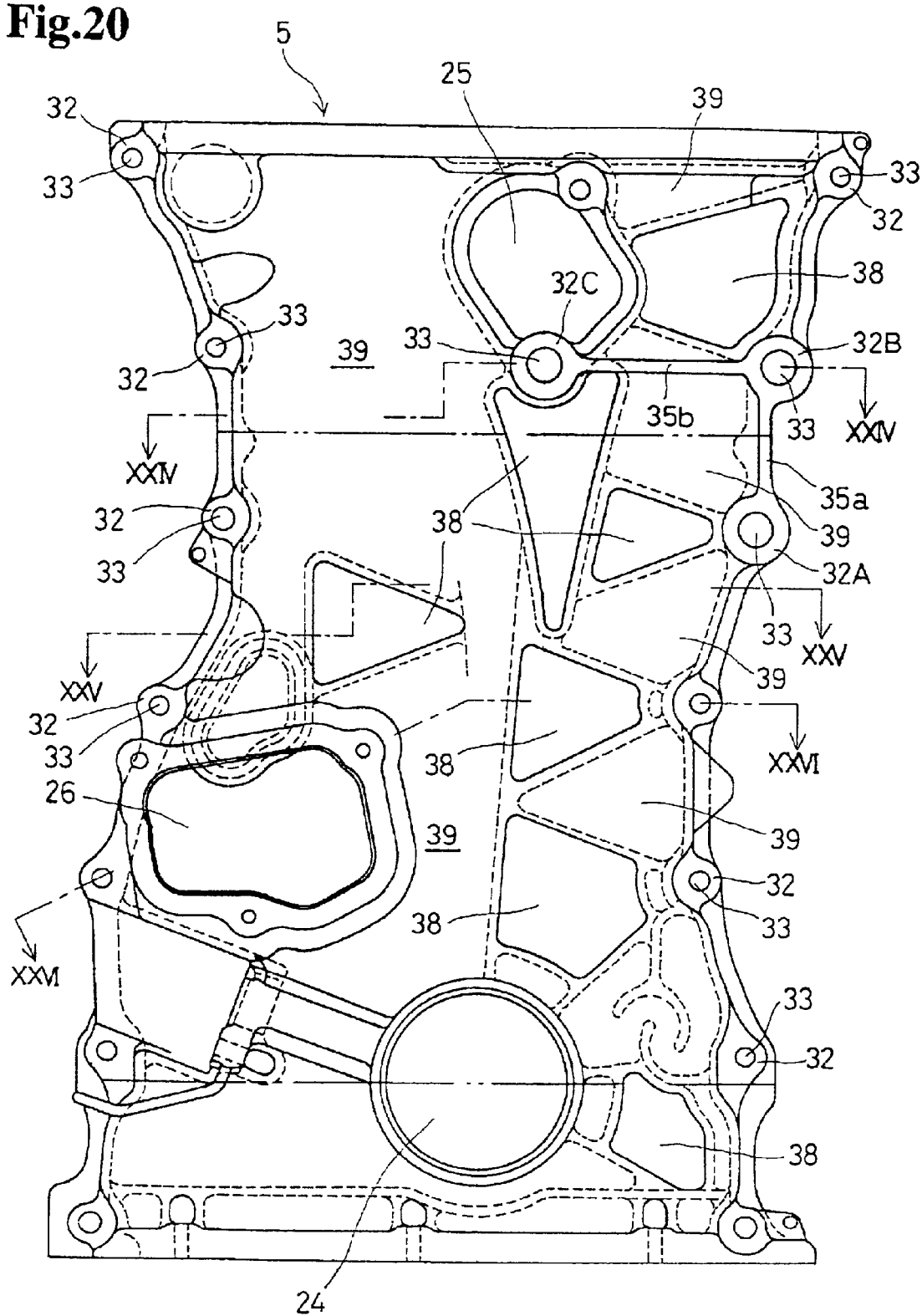
FIG. 20 is a view of the outer surface of a timing cover according to an embodiment of the invention.
Figure 21:
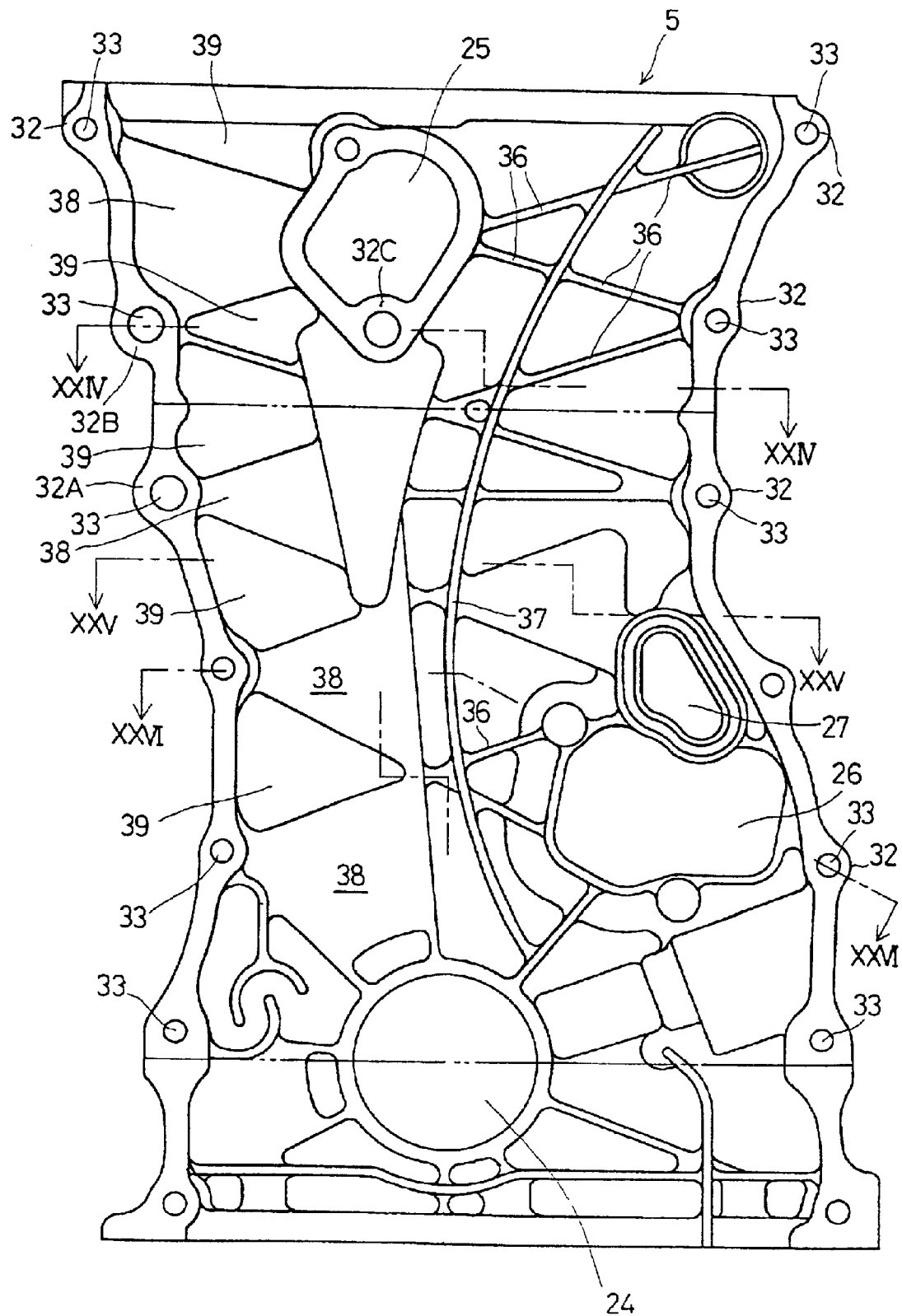
FIG. 21 is a view of the inner surface of the timing cover of FIG. 20.
Figure 22:
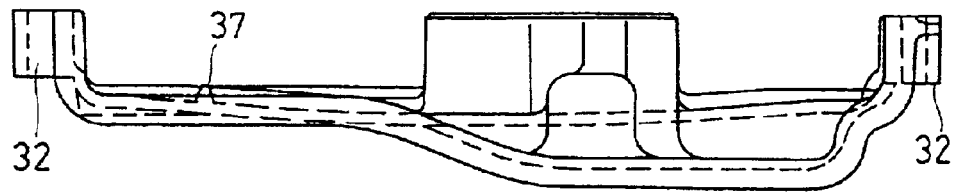
FIG. 22 is a view of the top surface of the timing cover of FIG. 20.
Figure 23:
FIG. 23 is a view of the bottom surface of the timing cover of FIG. 20.
Figure 24:
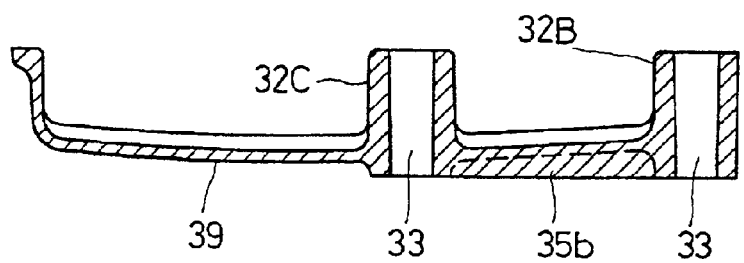
FIG. 24 is a trnasversal cross-sectional view taken along the XXIV—XXIV line of FIG. 21.
Figure 25:
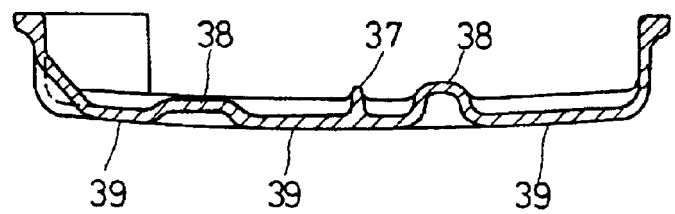
FIG. 25 is a transversal cross-sectional view taken along the XXV—XXV line of FIG. 21.
Figure 26:
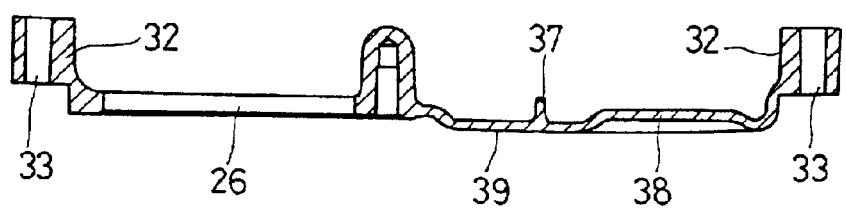
FIG. 26 is a transversal cross-sectional view taken along the XXVI—XXVI line of FIG. 21.
Figure 27:
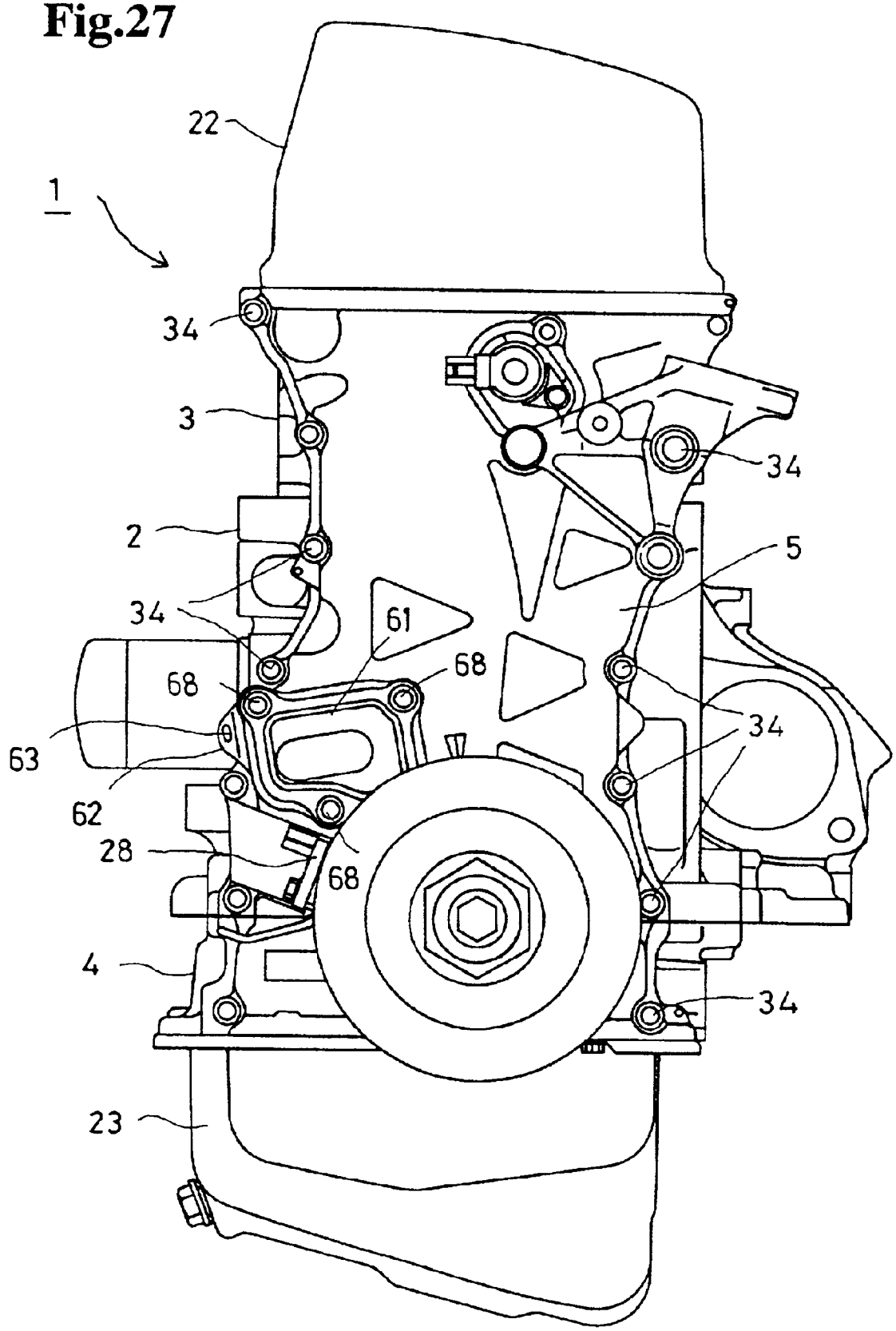
FIG. 27 is a front view of an internal combustion engine having a timing cover according to a still further embodiment of the invention.

An upper dash-and-dot line in FIG. 20 is the line indicating the joint of the cylinder head 3 and the cylinder block 2. The outer ribs 35a connect two fastening bolt bosses 32A, 32B formed along the outer edges of the timing cover 5, straddling from the cylinder head 3 to the cylinder block 2. The outer rib 35b connects the fastening bolt boss 32b on the outer edges of the timing cover 5 to the fastening bolt boss 32C located at a central position of the timing cover 5. If necessary, an outer rib connecting the fastening bolt bosses 32A and 32C may be provided additionally. These outer ribs 35a, 35b, etc. constitute a mount structure for mounting a mount bracket of the engine 1.

Since the mount bracket mount structure increases the rigidity along the fitting plane between the cylinder block 2 and the cylinder head 3, leakage of oil from this portion can be prevented. Further, since it is connected to the fastening bolt boss 32c in the central portion of the timing cover 5, vibrations of the entire timing cover 5 can be prevented, and the engine 1 can be fastened stably to a car body. Note that the mount bracket and the timing cover 5 can be fastened to the main body with common bolts.

In the foregoing embodiment, the plane of the timing cover is partitioned into a number of polygonal sections to define depressed planes and projecting planes by respective sides of the polygons as boundaries. In the embodiment shown here, however, such depressed and projecting surfaces are not formed, but ribs are formed on inner and outer surfaces of a planar timing cover partitioned into a number of polygonal sections at the same positions along the sides of the polygons. As a result, both the inner and outer surfaces are increased in strength, and vibrations of the entire timing cover are alleviated.

The ribs formed on the inner and outer surfaces of the timing cover include those connecting adjacent fastening bolt bosses of the timing cover. By connecting a plurality of fastening bolt bosses with ribs, strain of the timing cover between fastening bolt bosses is reduced, and generation of noises are prevented.

FIGS. 27 through 41 illustrate a still further embodiment of the invention. The same structures as those of the embodiment shown in FIGS. 1 through 6 are labeled in FIGS. 27 through 41 by using common reference numerals, but their explanation is omitted here.

Figure 30:
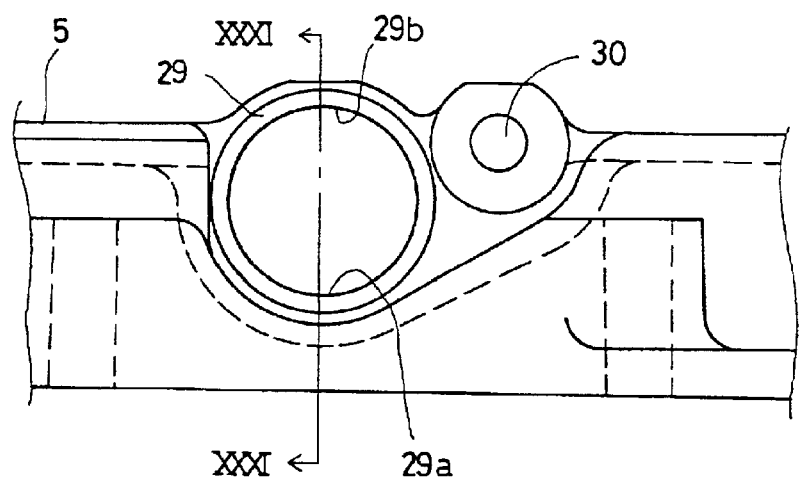
FIG. 30 is a view taken from the direction shown by the arrow XXX in FIG. 28.
Figure 31:
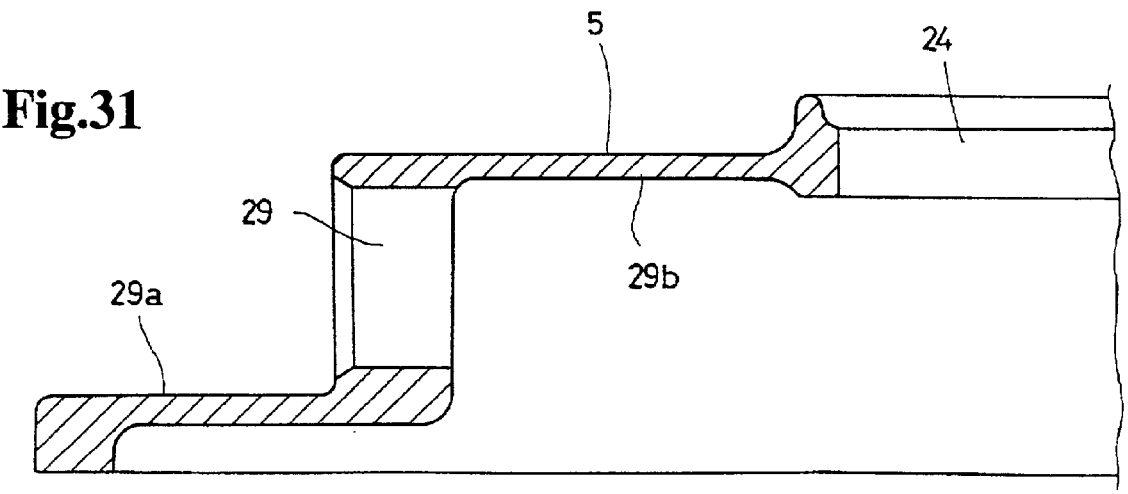
FIG. 31 is a transversal cross-sectional view taken along the XXXI—XXXI line of FIG. 30.
Figure 32:
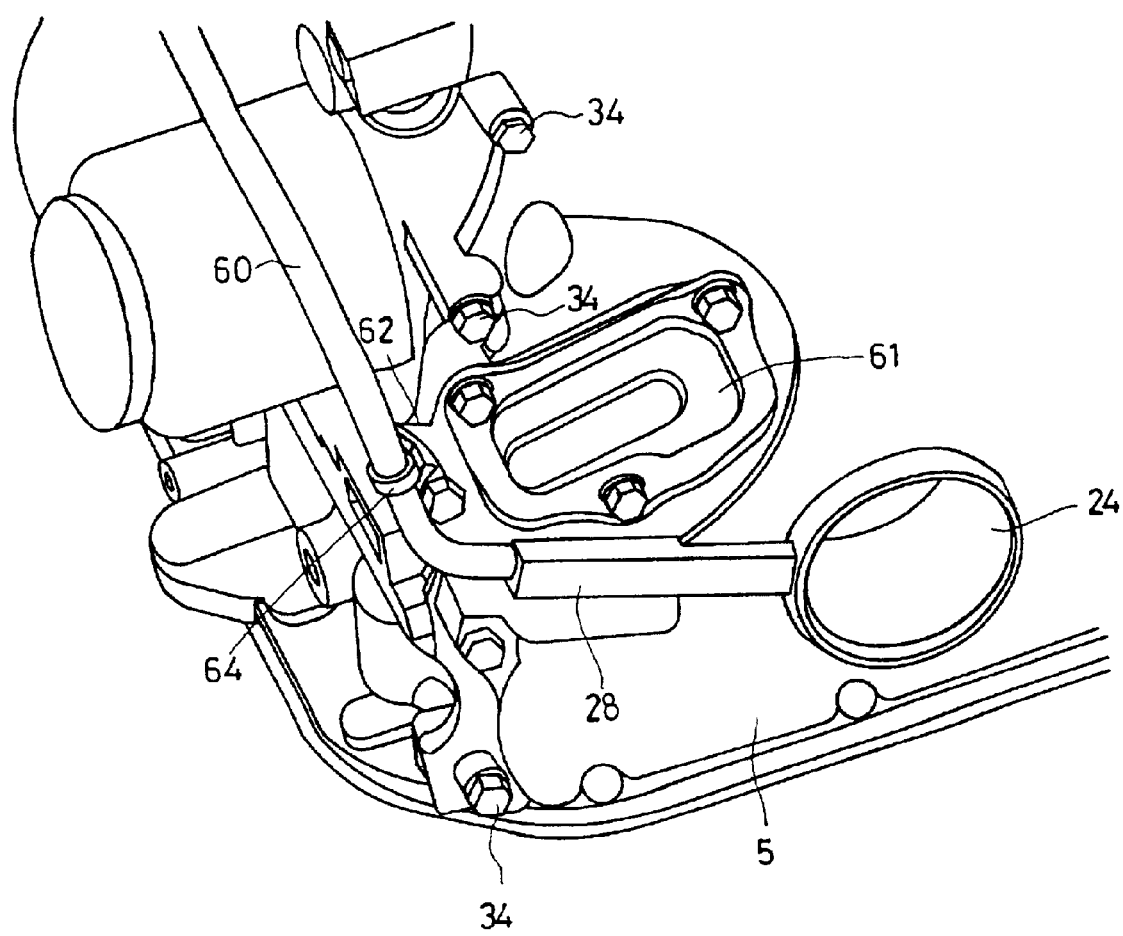
FIG. 32 is a perspective view illustrating a rotation detecting sensor and a harness that are assembled.
Figure 33:
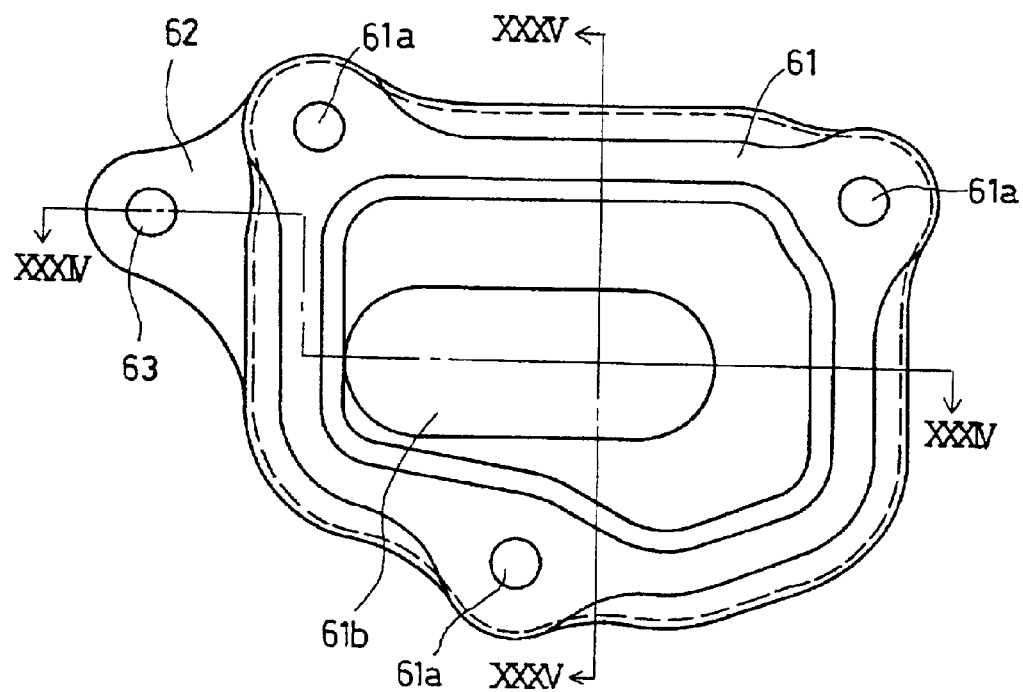
FIG. 33 is a front view of a maintenance cover.

The timing cover 5 has a sensor fitting portion 29 having a short cylindrical shape, which extends from below the maintenance opening 26 toward the center of the opening 24 to receive and support a rotation detecting sensor 28 for detecting rotation of the crank shaft 6. A portion 29b of the timing cover 5 from the sensor receiving portion 29 toward the opening 24 is bulged outward such that its inner surface defines a substantially semi-circular cylindrical plane as shown in FIGS. 30 and 31. At a portion 29a of the timing cover 5 remoter from the aperture 24 from the sensor receiving portion 29 is depressed inward such that its outer surface defines a substantially semi-circular cylindrical plane. Adjacent to the sensor receiving portion 29, a screw bore 30 is formed such that the rotation detecting sensor 28 inserted into the sensor receiving portion 29 from under the maintenance opening 26 toward the center of the opening 24 is attached to the timing cover 5 with a screw, not shown, applied into the screw bore 30 passing through the base portion of the rotation detecting sensor 28.

Figure 28:
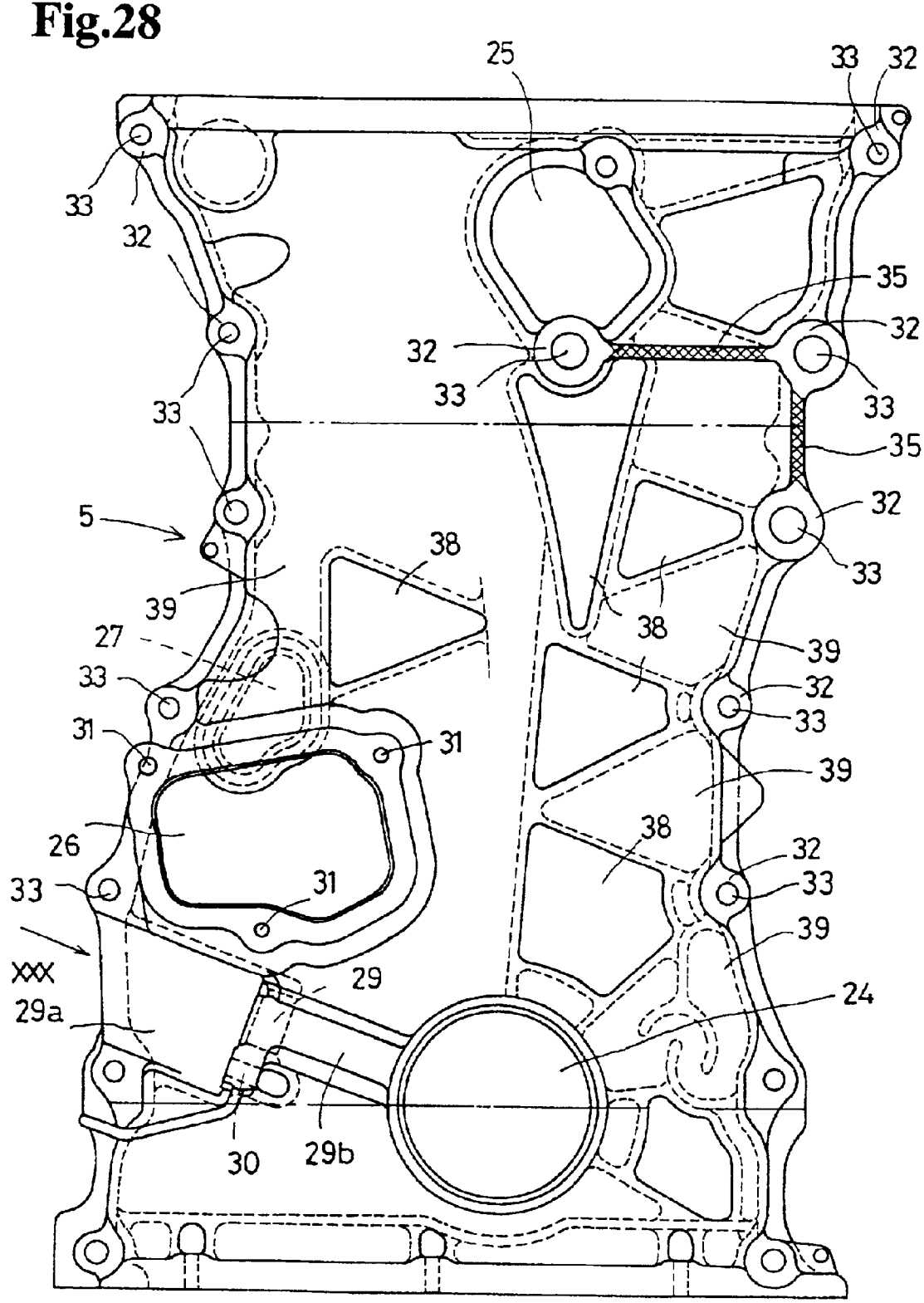
FIG. 28 is a view of the outer surface of the timing cover of FIG. 27.
Figure 29:
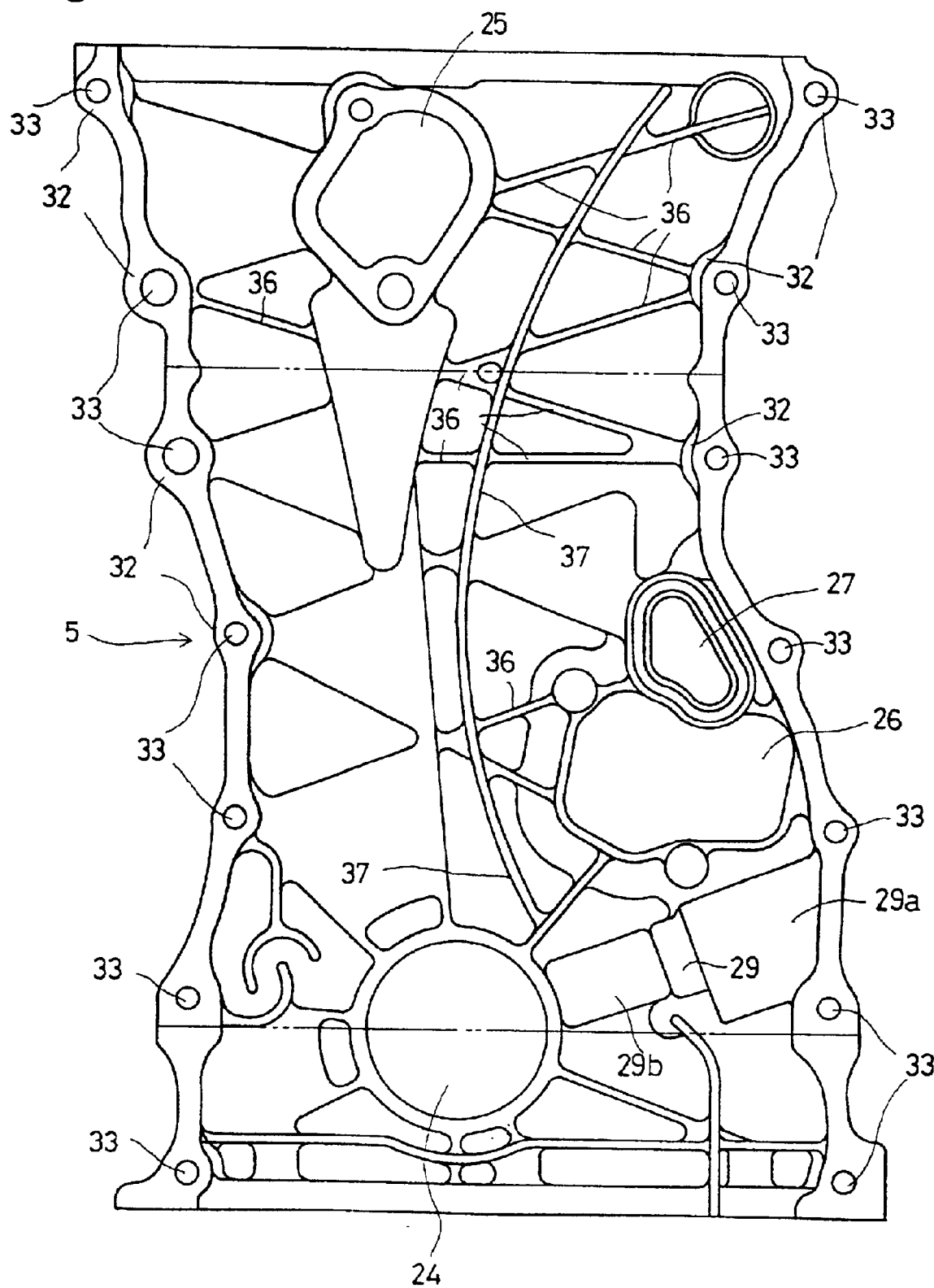
FIG. 29 is a view of the inner surface of the timing cover of FIG. 27.

As shown in FIG. 28, screw bores 31 for attaching the timing cover 5 are formed in the cylinder block 2, cylinder head 3 and crank case 4, and the timing cover 5 has mount holes 33 at boss portions 32 corresponding to respective screw bores 31. Thus the timing cover 5 can be detachably attached to the cylinder block 2, cylinder head 3 and crank case 4, which form the main body of the engine 1, with bolts 34 that are brought into threading engagement with the screw bores 31 through the mount holes 33.

Further, the timing cover 5 has two outer ribs 35 (cross-hatched in the drawing) on upper portions of the outer surface thereof to linearly connect adjacent boss portions 32. The timing cover 5 also has inner ribs 36 on the inner surface thereof to connect boss portions 32 located at one side of the cylinder block 2, cylinder head 3 and crank case 4 to boss portions 32 located at the other side of the cylinder block 2, cylinder head 3 and crank case 4, and a curved rib 37 arcuately extending along the chain guide member 13 of the chain tensioner 12. In the area surrounded by the inner ribs 36 and the curved rib 37, the timing cover 5 defines inwardly depressed recesses 38 and outwardly raised projecting portions 39.

Figure 34:
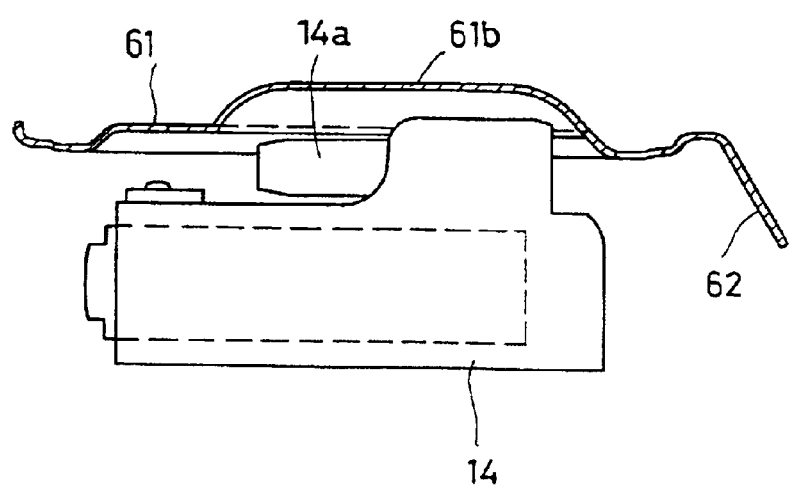
FIG. 34 is a longitudinal cross-sectional view taken along the XXXIV—XXXIV line of FIG. 33.
Figure 35:
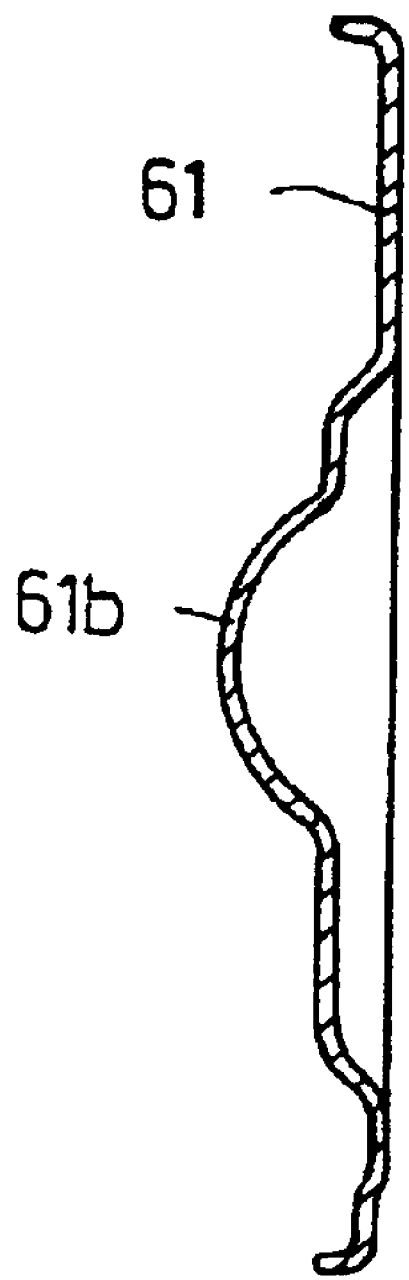
FIG. 35 is a transversal cross-sectional view taken along the XXXV—XXXV line of FIG. 33.
Figure 36:
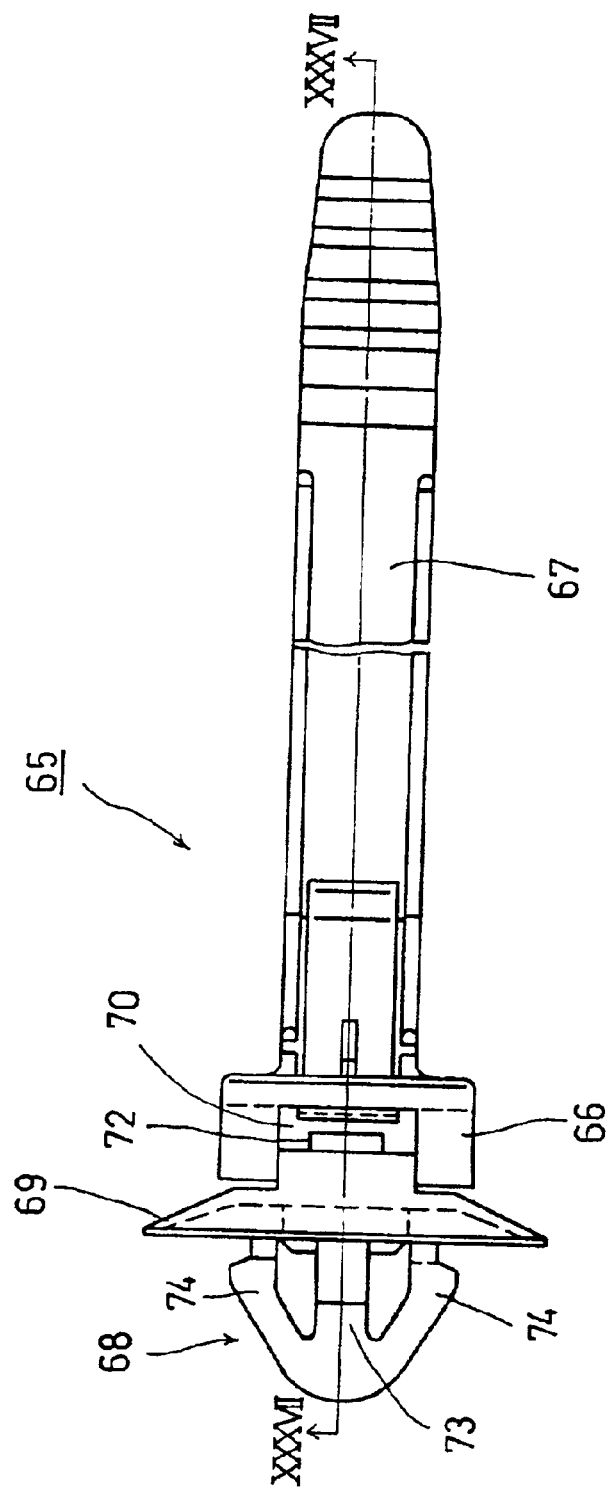
FIG. 36 is a plan view of a binder.
Figure 37:
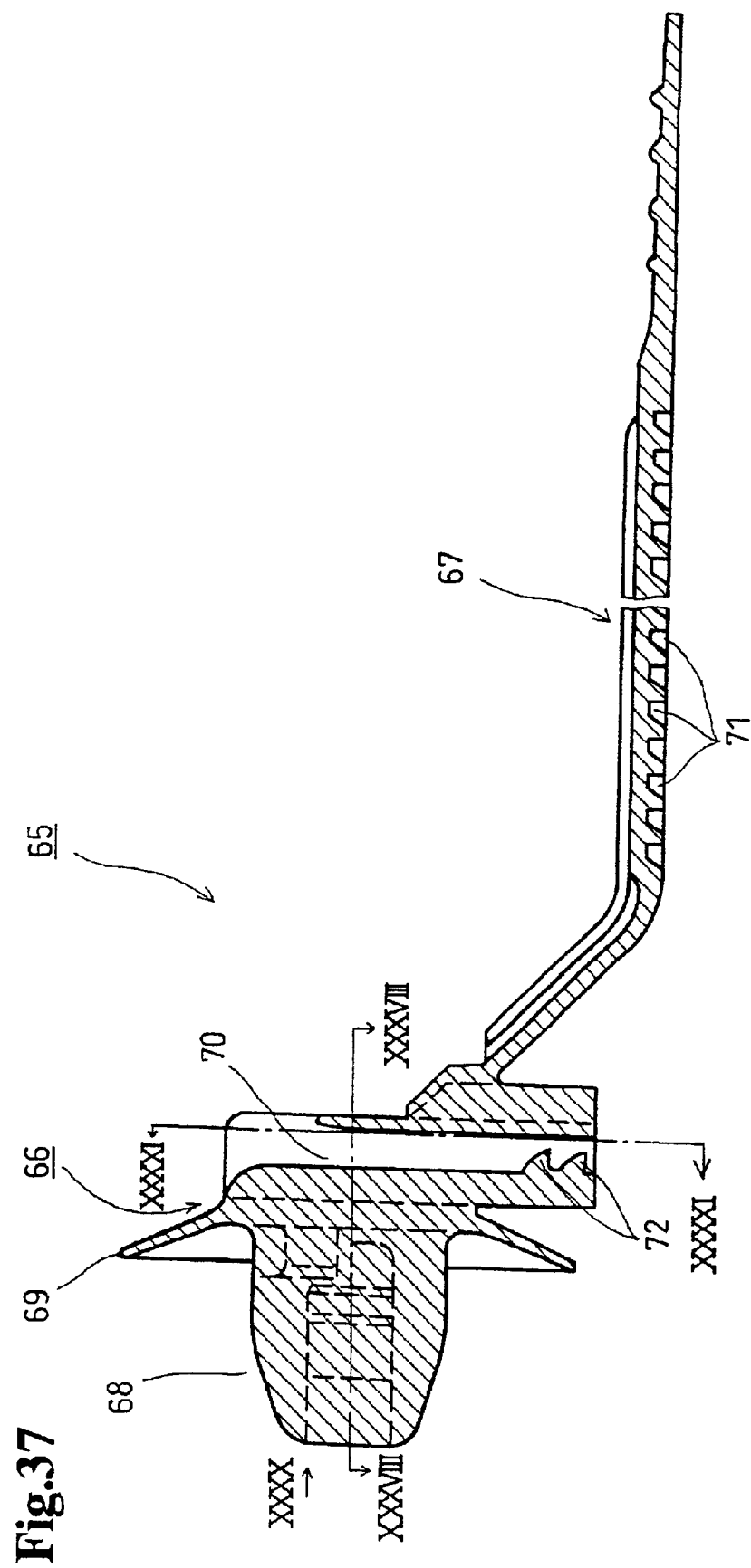
FIG. 37 is a longitudinal cross-sectional view taken along the XXXVII—XXXVII line of FIG. 36.

Then, as shown in FIG. 34, a maintenance cover 61 closing the maintenance opening 26 of the timing cover 5 is configured to define a curved plane bulging outward, and a binder mount portion or hold portion 62 is formed at an upper, outer side edge of the maintenance cover 61. The binder mount portion 62A has formed a mount hole 63 and it is bent by approximately 45 degrees toward the timing cover 5.

As shown in FIGS. 36 through 41, a nylon binder 65 for coupling a harness 60 to the binder mount portion 62 includes an elongated portion 67 first sloping down and then oriented horizontally behind the base portion 66, an engaging portion 68 detachably received and fixed in the mount hole 63 at the binder mount portion 62, and a flange portion 69 that can abut the inner surface of the binder mount portion 62. The elongated portion 67 of the binder 65 is configured to wind up the harness 60 of the rotation detecting sensor 28 and tip of the distal end of the elongated portion 67 is configured to be wound and withdrawn into an engaging hole 70 of the binder 65.

The elongated portion 67 has indentation 71 along its bottom surface whereas a claw 72 is formed in the engaging hole 70 such that, when the distal end of the elongated portion 67 is wound into the engaging hole 70, the elongated portion 67 is clamped therein not to slip out from the engaging hole 70.

Figure 38:
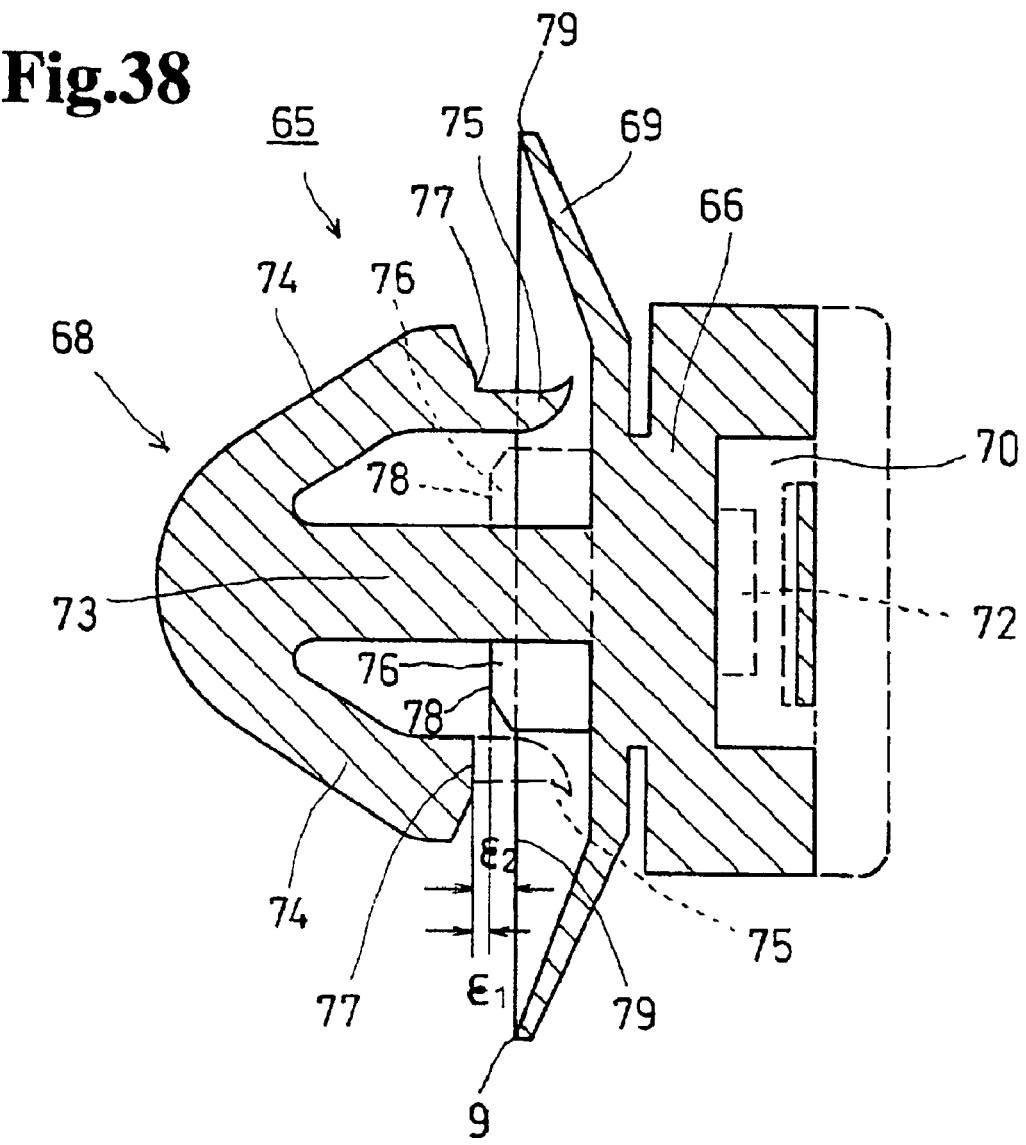
FIG. 38 is a transversal cross-sectional view taken along the XXXVIII—XXXVIII line of FIG. 37.
Figure 39:
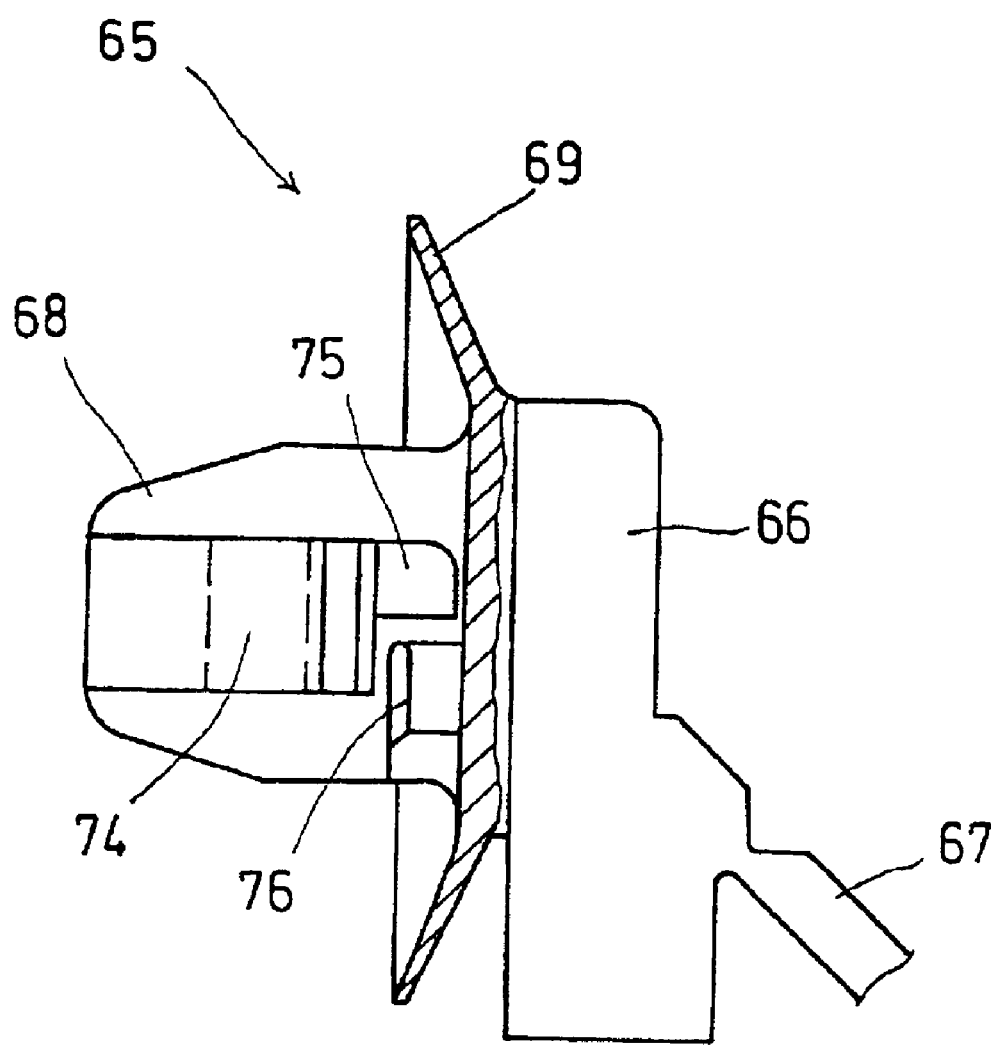
FIG. 39 is a side view of the binder partly cut out.
Figure 40:
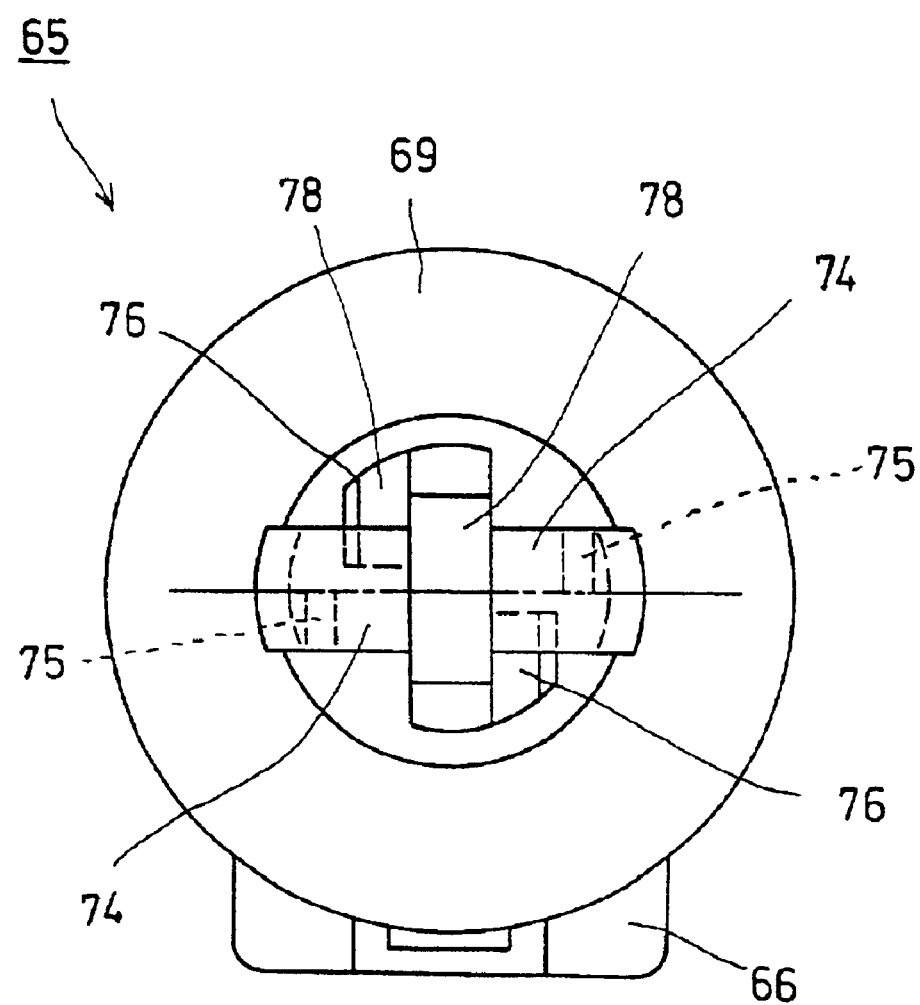
FIG. 40 is a view from the direction shown by the arrow XXXX in FIG. 37.
Figure 41:
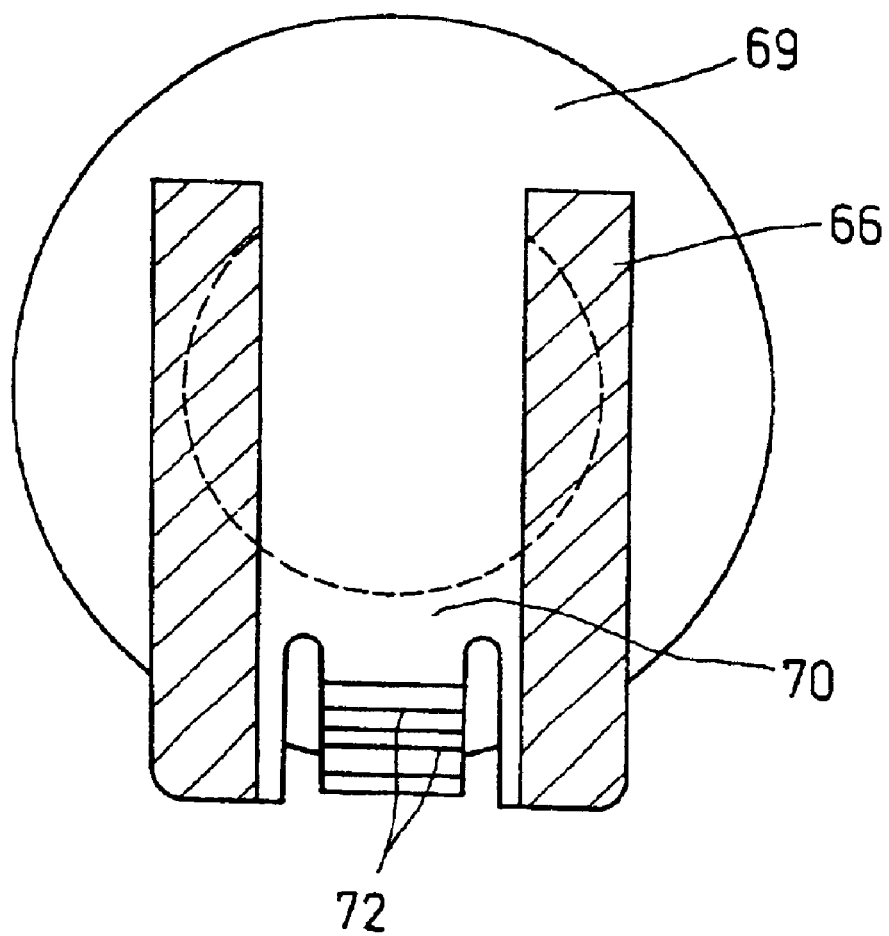
FIG. 41 is a longitudinal cross-sectional view taken along the XXXXI—XXXXI line of FIG. 37.

As shown in FIG. 38, a central portion 73 of the engaging portion 68 projects forward integrally from the base portion 66. Divergent arm portions 74 are formed integrally with the central portion 73 to extend right and left backward from the distal end thereof. Engaging elements 75 are formed integrally with distal ends of the divergent arm portions 74, and one (right one) of the pair of right and left engaging elements 75 is disposed only on the upper half of a divergent arm portion 74 whereas the other of the engaging elements 75 is disposed only on the lower half of another divergent arm portion 74 as shown in FIG. 40. Then, receiving portions 76 that can abut the binder mount portion 62 are integrally formed on the front face of the base portion 66 in a complementary positional relationship with the engaging elements 75.

As shown in FIG. 38, there is a gap $\epsilon_1$ between distal end surfaces 77 of the divergent arm portions 74 and end surfaces 78 of the receiving portions 76, and there is a gap $\epsilon_2$ between the distal end surfaces 77 of the divergent arm portions 74 and the end edge 79 of the flange portion 69.

In the embodiment shown in FIGS. 27 through 41, the timing cover 5 is put on one end surface of the cylinder block 2, cylinder head 3 and crank case 4, the bolts 34 inserted through the mount holes 33 of the boss portions 32 on the timing cover 5 are next brought into engagement with the screw bores 31 on the part of the cylinder block 2, cylinder head 3 and crank case 4, the cylinder head cover 22 is attached to the cylinder head 3, and the oil pan 23 is attached to the crank case 4. Thereby, the driving force transmission mechanism of the valve driving system of the engine 1 is completely sealed.

Further, since the maintenance cover 61 and the timing cover 5 are fastened together to the cylinder block 2 by inserting bolts 64 through the bolt holes 51a along the outer circumference of the maintenance cover 61 and then bringing them into tight engagement with the screw bores 31 of the cylinder block 2 through the mount holes 33 of the timing cover 5, the maintenance cover 61 can be attached firmly to the timing cover 5, and the common use of the bolts contributes to decreasing parts.

In addition, since the binder mount portion 62 of the maintenance cover 61 inclines by approximately 45 degrees with respect to the major central portion of the maintenance cover 61, the harness 60 of the rotation detecting sensor 28 is supported rigid against vibrating force in a direction rectangular to the timing cover 5.

Furthermore, since the rotation detecting sensor 28 is adjacent to and below the maintenance opening 26 and the mounting side of the maintenance cover 61, and the harness 60 drawn out from the rotation detecting sensor 28 is held by the binder 65 engaging the mount hole 63 of the binder mount portion 62 of the maintenance cover 61 in the proximity, the harness 60 is supported stably without generating large vibrations and far from the possibility of hitting the maintenance cover 61.

Moreover, the harness 60 can be replaced easily by merely disconnecting the binder 65 from the binder mount portion 62 without removing the maintenance cover 61 from the timing cover 5.

Since the maintenance cover 61 is configured to bulge outward at the position 51b corresponding to a relief valve 14a of the lifter 14 as shown in FIG. 34, the major central portion of the maintenance cover 61 is enhanced in strength and rigidity, and vibrations are unlikely to occur.

Even if the relief valve 14a of the lifter 14 projects outward relative to the chain guide member 13 and the chain guide 11, since the timing cover 5 has the maintenance opening 26 and the maintenance cover 61 has the bulging portion 51a avoiding the relief valve 14a of the lifter 14, the timing cover 5 can be attached closely to the cylinder block 2, cylinder head 3 and crank case 4 as the main body of the engine 1 so as to closely pack the entire engine 1.

In the structure of the binder 65, if the plate thickness of the binder mount portion 62 of the maintenance cover 61 is equal to or slightly thicker than $\epsilon_1$, the binder mount portion 62 is firmly supported between the distal end surface 77 of the divergent arm portion 74 and the end surface 78 of the receiving portion 76, and the binder 65 is immovably held by the binder mount portion 62.

Even if the plate thickness of the binder mount portion 62 of the maintenance cover 61 is thicker than $\epsilon_1$ and approximately equal to $\epsilon_2$, since the engaging elements 75 and the receiving portions 76 are disposed alternately as shown in FIG. 40 and permit the central portion 73 coupling the receiving portions 76 and the engaging elements 75 to deform in a bending and twisting mode, the central portion 63 and the divergent arm portions 74 are deformable to adjust the distance between the distal end surfaces 77 and the end surfaces 78 in accordance with the plate thickness of the binder mount portion 62 of the maintenance cover 61. As a result, the binder 65 can be reliably coupled to the binder mount portion 62 of the maintenance cover 61.

What is claimed is:

1. A case member mounting structure comprising
a case member fitted onto a device body,
an outer circumferential portion of the case member being fastened to said device body by a plurality of fasteners,
the case member and the device body making a first contact between a contact surface of the outer circumferential portion of the case member and an outer wall surface of said device body on which said case member is fitted;
at least one projecting portion formed on one or both of an inner surface of the case member and the outer wall surface of the device body to make an additional contact between said case member and said device body, said projecting portion being formed proximate to a central region of said case member and distal said outer circumferential portions where said fasteners are provided; and
a damping device making contact with said case member at a second contact surface located at a distal end of said projecting portion.

2. The case member mounting structure according to claim 1 wherein said seal member is a liquid seal member coated on at least one of contact surfaces at distal ends of said projecting portions, whereby rigidity of the case member is increased and vibrations of the case member are suppressed.

3. The case member mounting structure according to claim 1 wherein said seal member is a resilient seal member which is brought into engagement with an engaging portion provided in at least one of contact surfaces at distal ends of said projecting portions, whereby the case member and the device body are elastically coupled, and vibrations of the case member are damped by the resilient member.

4. The case member mounting structure according to claim 1 wherein said contact surfaces of said distal ends of said projecting portions lie on a common plane to said outer wall surface of said device body, or to said inner wail surface of said case member to be fastened to said device body.

5. The case member mounting structure according to claim 1 wherein said contact surfaces of the distal ends of said projecting portions lie on a plane different from the plane of said outer wall surface of said device body, or from the plane of said inner wall surface of said case member to be fastened to said device body.

6. The case member mounting structure according to claim 1 wherein at least one projecting portion projects from one of said inner surface of said case member and said outer wall surface of said device body toward the other.

7. The case member mounting structure according to claim 1 wherein a surface of said case member is partitioned into polygonal sections, and respective said polygonal sections define depressed planes and projecting planes bordered by respective sides of the polygons.

8. The case member according to claim 1, where said case member is shaped differently from said device body.

9. A case member mounting structure comprising
a case member, for covering a driving force transmission mechanism, fitted onto a body of an internal combustion engine,
an outer circumferential portion of the case member being fastened to said body by a plurality of fasteners,
the case member and the body making a first contact between a contact surface of the outer circumferential portion of the case member and an outer wall surface of said body on which said came member is fitted;
at least one projecting portion formed on one or both of an inner surface of the case member and the outer wall surface of the body to make an additional contact between said case member and said body, said projecting portion being formed at a location other proximate to a central region of said case member and distal said outer circumferential portions where said fasteners are provided; and
a damping device making contact with said case member at a second contact surface located at a distal end of said projecting portion.

10. The case member mounting structure according to claim 9 wherein said seal member is a liquid seal member coated on at least one of contact surfaces at distal ends of said projecting portions.

11. The case member mounting structure according to claim 9 wherein said seal member is a resilient seal member which is brought into engagement with an engaging portion provided in at least one of contact surfaces at distal ends of said projecting portions.

12. The case member mounting structure according to claim 9 wherein said contact surfaces of said distal ends of said projecting portions lie on a common plane to said outer wall surface of said body, or to said inner wall surface of said case member to be fastened to said body.

13. The case member mounting structure according to claim 9 wherein said contact surfaces of the distal ends of said projecting portions lie on a plane different from the plane of said outer wall surface of said body, or from the plane of said inner wall surface of said case member to be fastened to said body.

14. The case member mounting structure according to claim 9 wherein at least one projecting portion projects from one of said inner surface of said case member and said outer wail surface of said body toward the other.

15. The case member mounting structure according to claim 9 wherein at least one of said projecting portions has a lubricant oil injection hole.

16. A case member mounting structure comprising a plurality of fastening bolt bosses formed along an outer circumference of a case member for applying a plurality of fastening bolts, respectively, such that said case member is attached to a device body or a body of an internal combustion engine with said fastening bolts, wherein an inner surface of said case member is partitioned into polygonal sections, and different ones of said polygonal sections define respective depressed planes and projecting planes on the inside surface, said depressed planes and projecting planes being bordered by respective sides of the polygons; and wherein sides of the polygonal sections are straight, and the depressed planes and projecting planes are adjacent to each other.

17. The case member mounting structure according to claim 15 wherein said fastening bolt bosses are located on extension lines of respective sides of the polygons.

18. The case member mounting structure according to claim 16 wherein said case member has ribs at the same positions on inner and outer surfaces thereof, and said ribs partition said inner and outer surfaces of said case member into polygonal sections.

19. The case member mounting structure according to claim 16, comprising a first seal member on a contact surface at a distal ends of said fastening bolt bosses, and wherein said first seal member is oh same type as a second seal member applied along outer circumference with which said came member and said device body or said body of an internal combustion engine are fastened together.

* * * * *